US010787983B2

(12) United States Patent
Idogawa et al.

(10) Patent No.: US 10,787,983 B2
(45) Date of Patent: Sep. 29, 2020

(54) CONTROLLER AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Masanao Idogawa, Toyota (JP); Isao Nakajima, Nagoya (JP); Masahiro Noguchi, Handa (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 134 days.

(21) Appl. No.: 16/141,013

(22) Filed: Sep. 25, 2018

(65) Prior Publication Data
US 2019/0162131 A1    May 30, 2019

(30) Foreign Application Priority Data

Nov. 29, 2017 (JP) .................. 2017-229579

(51) Int. Cl.
F02D 41/00 (2006.01)
F02D 41/24 (2006.01)
F02B 37/00 (2006.01)
F02B 37/18 (2006.01)
F02D 41/26 (2006.01)
F02D 41/20 (2006.01)

(52) U.S. Cl.
CPC ........ F02D 41/2464 (2013.01); F02B 37/001 (2013.01); F02B 37/186 (2013.01); F02D 41/0007 (2013.01); F02D 41/26 (2013.01); F02D 41/20 (2013.01); F02D 2250/16 (2013.01)

(58) Field of Classification Search
CPC .. F02B 37/001; F02B 37/186; F02D 41/0007; F02D 41/2464; F02D 41/26; F02D 41/20; F02D 2250/16
USPC .................................. 60/602, 605.2, 612
See application file for complete search history.

(56) References Cited

U.S. PATENT DOCUMENTS

| 2001/0016795 | A1* | 8/2001 | Bellinger | B60W 10/06 701/53 |
| 2008/0066723 | A1* | 3/2008 | Eiraku | F02D 41/0007 123/564 |
| 2009/0229583 | A1 | 9/2009 | Kotooka et al. | |
| 2011/0314807 | A1* | 12/2011 | Karnik | F02B 37/183 60/602 |
| 2014/0325982 | A1* | 11/2014 | Maruo | F02B 37/183 60/602 |
| 2016/0010541 | A1* | 1/2016 | Wang | F02B 37/186 60/602 |

(Continued)

FOREIGN PATENT DOCUMENTS

| JP | H05-231165 A | 9/1993 |
| JP | 2006-161683 A | 6/2006 |

Primary Examiner — Thai Ba Trieu
Assistant Examiner — Dapinder Singh
(74) Attorney, Agent, or Firm — Oliff PLC

(57) ABSTRACT

A wastegate opens and closes the flow path of a bypass passage that bypasses the turbine of a forced-induction device. A processor changes the drive current for the electric actuator in a stepwise manner from a state where the wastegate is stationary in a given standstill position. The amount of change in the drive current that is made until the wastegate is determined to be moved is learned as a learning value. A requested drive current for moving the wastegate to a target opening degree is corrected based on the learning value.

11 Claims, 12 Drawing Sheets

(56) References Cited

U.S. PATENT DOCUMENTS

2017/0314459 A1* 11/2017 Li .................. F02B 37/186
2018/0119607 A1*  5/2018 Ono ................ F02B 37/186

* cited by examiner

[First reference-position setting process]

[First learning process]

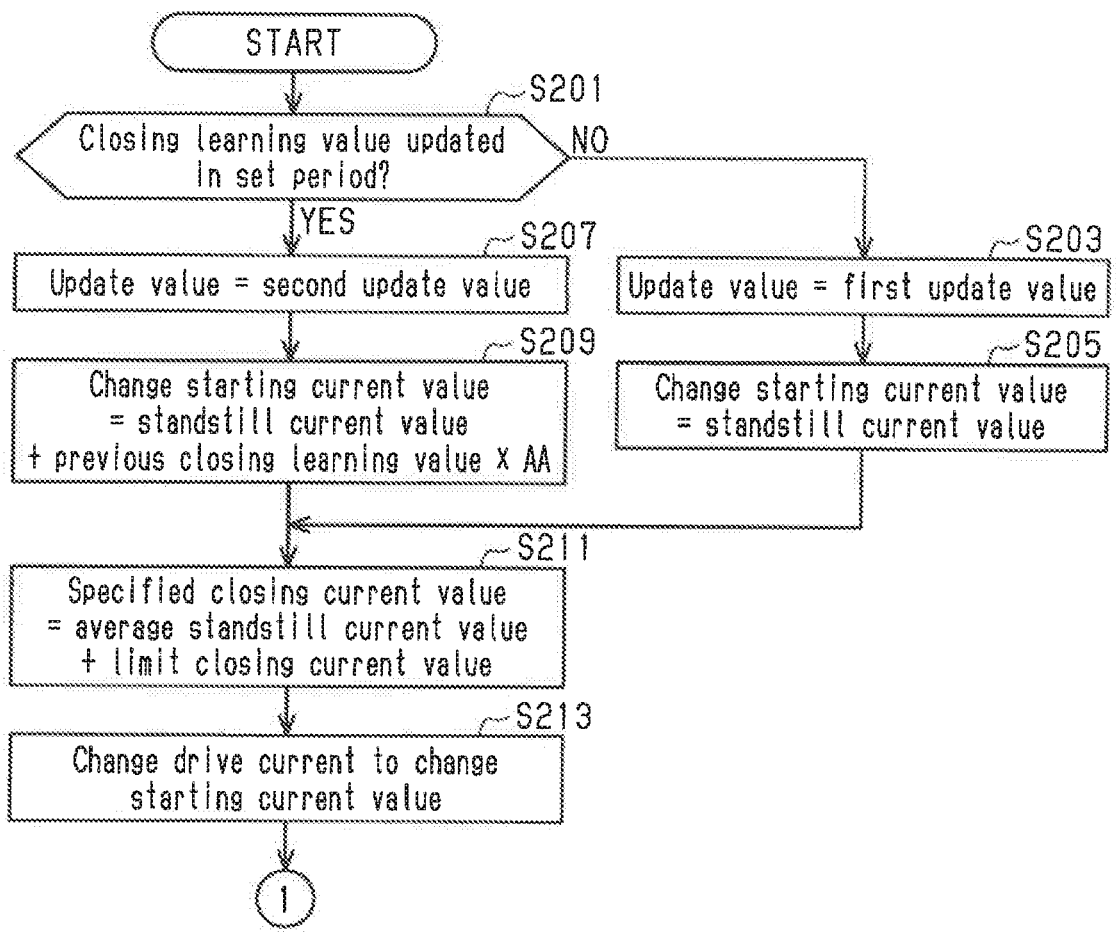

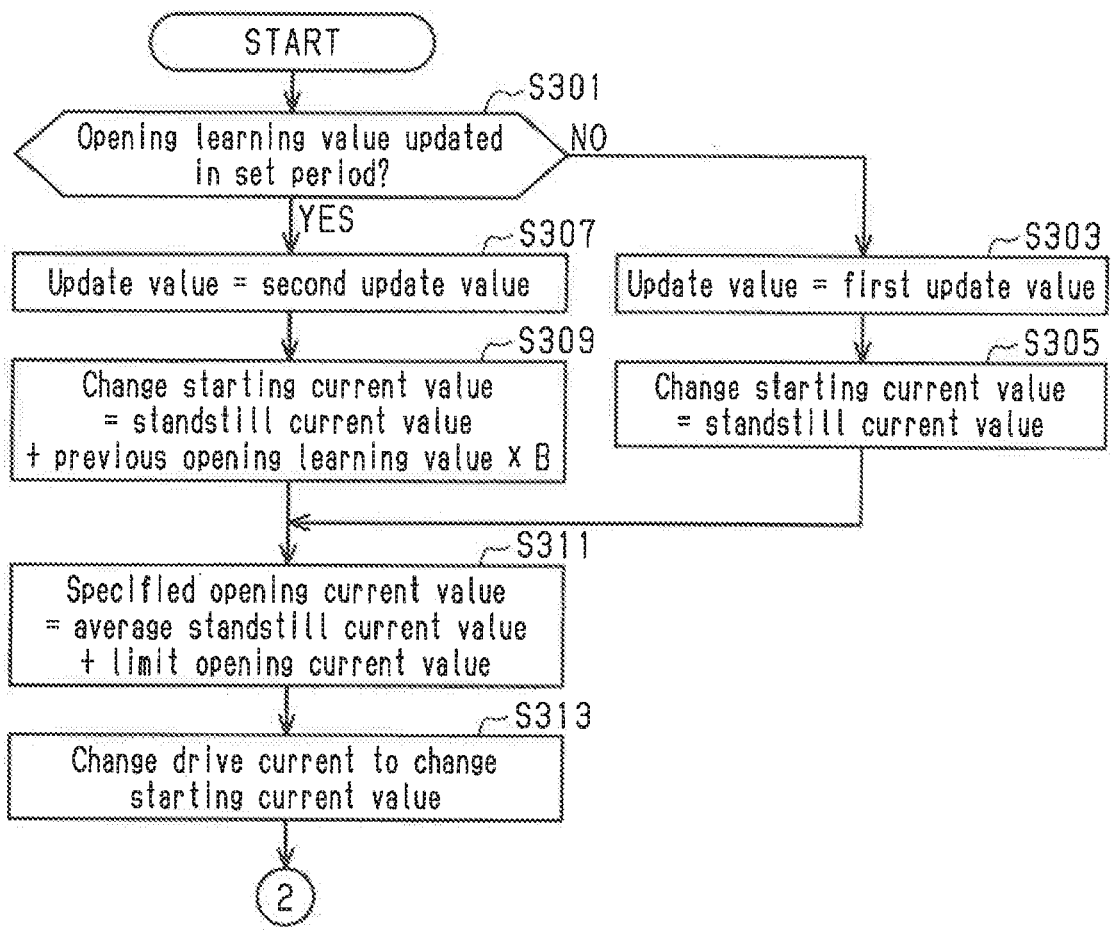

[Opening learning process]

CONTROLLER AND CONTROL METHOD FOR INTERNAL COMBUSTION ENGINE

BACKGROUND

The present disclosure relates to a controller (control device) and control method for an internal combustion engine.

Japanese Laid-Open Patent Publication No. 05-231165 discloses an internal combustion engine that includes a forced-induction device for compressing intake air using the exhaust stream. The forced-induction device is located in both of the intake passage and the exhaust passage. The forced-induction device has a turbine located in the exhaust passage. The exhaust stream rotates the turbine. The forced-induction device also includes a compressor located in the intake passage. The compressor is rotated by rotation of the turbine and sends intake air toward cylinders.

The exhaust passage includes a bypass passage that bypasses the turbine. The bypass passage connects the section of the exhaust passage upstream of the turbine in the exhaust flow to the section of the exhaust passage downstream of the turbine. The bypass passage includes a wastegate, which opens and closes the flow path of the bypass passage. Opening and closing of the wastegate increase and reduce the amount of exhaust bypassing the turbine through the bypass passage, thereby increasing and reducing the amount of compressed intake air.

The wastegate is driven by an actuator, which includes a rod coupled to the wastegate. The actuator also includes an electromagnetic coil. The rod moves when a drive current is applied to the electromagnetic coil. This opens or closes the wastegate.

The magnitude of the drive current supplied to the electromagnetic coil determines the amount of movement of the rod and thus the amount of movement of the wastegate. The magnitude of the drive current is controlled by a controller.

Wastegates that are electrically moved by a drive current, like the wastegate and the actuator disclosed in Japanese Laid-Open Patent Publication No. 05-231165, may slightly differ from one another in responsiveness to the drive current. Further, even with the same actuator and the wastegate, the responsiveness of the wastegate to the drive current may vary due to any deposits formed on the surface of the wastegate. Controlling the movement amount of the wastegate, that is, the magnitude of the drive current, without considering the variations in responsiveness of wastegates may lead to inaccurate control of the boost pressure.

SUMMARY

Examples of the present disclosure will now be described.

Example 1

A controller for an internal combustion engine is provided. The engine includes a forced-induction device, which is located in both of an intake passage and an exhaust passage and has a turbine located in the exhaust passage, a bypass passage, which bypasses the turbine and connects a section of the exhaust passage that is upstream of the turbine in an exhaust flow to a section of the exhaust passage that is downstream of the turbine in the exhaust flow, a wastegate, which opens and closes a flow path of the bypass passage, and an electric actuator, which moves the wastegate so as to open and close the wastegate. The controller includes a calculation section configured to calculate a requested drive current for moving the wastegate to a target opening degree, an output section configured to supply the electric actuator with a drive current that matches with the requested drive current, a learning section configured to perform a learning process that changes the drive current in a stepwise manner from a state where the wastegate is stationary in a given standstill position and learns, as a learning value, an amount of change in the drive current that is made until the wastegate is determined to be moved, and a correction section configured to perform a correction process that corrects the requested drive current based on the learning value.

This configuration learns, as a learning value, the amount of change in the drive current that is required to start moving the wastegate, and corrects the requested drive current for moving the wastegate, based on the learning value. This allows the electric actuator to be supplied with the drive current that is determined considering the responsiveness of the wastegate to the drive current. Consequently, the movement amount of the wastegate and thus the boost pressure are controlled correctly.

Example 2

In the controller for an internal combustion engine of Example 1, in the learning process, a predetermined delay period, which is a fixed period from a point in time at which the drive current is changed by one step, and a predetermined calculation period, which is a period between a point in time at which the delay period ends and a point in time at which the drive current is changed again, are set in advance. The wastegate is determined to be moved when the wastegate is moved at least by a given opening degree in the calculation period.

To avoid being affected by the heat of exhaust gas, the opening degree sensor, which detects the opening degree of the wastegate, is arranged in the electric actuator or its vicinity, instead of near the wastegate. The opening degree sensor detects, as the opening degree of the wastegate, the position of the part that is used as the detection target of the opening degree sensor. This part may be a component of the coupling mechanism coupling the wastegate to the electric actuator, or a rod of the electric actuator.

When the wastegate is stationary, there are narrow gaps between parts that couple the electric actuator to the coupling mechanism, between parts of the coupling mechanism, and between parts that couple the coupling mechanism to the wastegate. When a drive current is supplied to the electric actuator with the wastegate being stationary, these parts first move so as to fill the gaps between them. This movement changes the detection value of the opening degree sensor. However, the wastegate is still stationary. That is, immediately after the drive current is changed by one step, the detection value of the opening degree sensor may change due to the movement of the parts that fill the gaps between them while the wastegate is still stationary. As such, the period in which the parts move only to fill the gaps between them is preferably excluded from the period in which it is determined whether the wastegate is moved.

In this respect, the configuration described above has the delay period before the calculation period, in which it is determined whether the wastegate is moved. Setting the delay period provides a period in which the parts move so as to fill the gaps between them before the determination of movement of the wastegate starts. This limits the possibility that the wastegate is erroneously determined to be moved due to the change in the detection value of the opening degree sensor caused by the movement of the parts that only fill the gaps between them.

The current value tends to fluctuate immediately after the drive current is changed by one step. Setting the delay period before the calculation period provides a period in which the current value becomes stable before the determination of movement of the wastegate starts.

Consequently, the determination on whether the wastegate is moved is performed when the current value is relatively stable.

Example 3

In the controller for an internal combustion engine of Example 2, the learning section is configured to calculate, as the amount of change in the drive current that is learned as the learning value, a difference between an average value of the drive current supplied in a period in which the wastegate is stationary in the standstill position and an average value of the drive current supplied in the calculation period.

The drive current may fluctuate due to noise or other factors. If the amount of change in drive current is calculated using the value of drive current at a specific point in time in the calculation period, for example, such fluctuation may excessively increase or reduce the amount of change in the drive current, which is to be learned as a learning value. This may lead to a greater error in the learning value. In this respect, the present configuration uses the average value and thus obtains a learning value that is unlikely to be affected by any error caused by the fluctuation of the drive current.

Example 4

In the controller for an internal combustion engine of Example 3, the learning section is configured to, when the average value of the drive current supplied in the calculation period exceeds a specified current value while the drive current is changed in a stepwise manner from the state where the wastegate is stationary in the standstill position, learn, as the learning value, an amount of change in the drive current that is made between when the learning process is started and when the average value reaches the specified current value, even if the wastegate is not moved by the given opening degree.

This configuration prevents a learning value from becoming abnormal or impossible to obtain due to any malfunction of the wastegate.

Example 5

In the controller for an internal combustion engine of Example 1, the learning section is configured to, when the learning value has not been updated in a predetermined set period, increase an amount of change in the drive current that is made per step in the learning process, as compared to when the learning value has been updated in the set period.

This configuration increases the amount of change in drive current per step when performing a learning process under a condition where the learning value has not been updated in the set period. As such, when the drive current is changed in a stepwise manner, the drive current becomes closer to the final learning value without being changed in many steps. This shortens the time required for the learning process.

Example 6

In the controller for an internal combustion engine of Example 1, the learning section is configured to, when the learning value has already been learned, calculate a change starting current value, from which the stepwise change in the drive current starts in the learning process, based on the learning value. The learning section is configured to, in the learning process, starting the stepwise change in the drive current after changing the drive current from the state where the wastegate is stationary in the standstill position to the change starting current value in a single step.

This configuration factors the learning value that has already been learned into the change starting current value and, in a learning process, changes the drive current to the change starting current value in a single step. That is, in a learning process, the drive current is changed directly to the change starting current value. The above configuration thus shortens the time required to obtain the final learning value.

Example 7

In the controller for an internal combustion engine of Example 1, the learning section is configured to: when an ignition switch is turned on, perform a closing learning process first and then perform an opening learning process after completing the closing learning process; learn a closing learning value in the closing learning process by changing the drive current so as to reduce the opening degree of the wastegate; and learn an opening learning value in the opening learning process by changing the drive current so as to increase the opening degree of the wastegate.

To increase the boost pressure after the ignition switch is turned on, the wastegate is moved to reduce the opening degree of the wastegate. If the wastegate is moved to an opening degree that is deviated from the intended opening degree, it would be difficult to accurately control the boost pressure when increasing the boost pressure. The above configuration gives priority to a closing learning process over an opening learning process and first updates the closing learning value when the ignition switch is turned on. Thus, a more recent learning value may be used to increase the boost pressure by reducing the opening degree of the wastegate. This limits deviation of the opening degree of the wastegate.

Example 8

In the controller for an internal combustion engine of Example 1, the learning section is configured to: perform a closing learning process and an opening learning process alternately; learn a closing learning value in the closing learning process by changing the drive current so as to reduce the opening degree of the wastegate; and learn an opening learning value in the opening learning process by changing the drive current so as to increase the opening degree of the wastegate.

When one type of learning process has priority over the other, such as when the closing learning process has priority, opportunities for the other learning process may be significantly reduced. In this respect, the present configuration performs opening and closing learning processes alternately. Accordingly, the learning values are updated successively both when the drive current is changed to increase the opening degree of the wastegate and when the drive current is changed to reduce the opening degree.

Example 9

A controller for an internal combustion engine is provided. The internal combustion engine includes a first bank, a second bank, a first forced-induction device, which is located in both of a first intake passage and a first exhaust passage for the first bank and has a first turbine located in the first exhaust passage, a first bypass passage, which bypasses the first turbine and connects a section of the first exhaust passage that is upstream of the first turbine in an exhaust flow to a section of the first exhaust passage that is downstream of the first turbine in the exhaust flow, a first wastegate, which opens and closes a flow path of the first bypass passage, a first electric actuator, which moves the first wastegate so as to open and close the first wastegate, a second forced-induction device, which is located in both of a second intake passage and a second exhaust passage for the second bank and has a second turbine located in the second exhaust passage, a second bypass passage, which bypasses the second turbine and connects a section of the second exhaust passage that is upstream of the second turbine in an exhaust flow to a section of the second exhaust passage that is downstream of the second turbine in the exhaust flow, a second wastegate, which opens and closes a flow path of the second bypass passage, and a second electric actuator, which moves the second wastegate so as to open and close the second wastegate. The controller includes a calculation section configured to calculate a first requested drive current for moving the first wastegate to a target opening degree, and calculate a second requested drive current for moving the second wastegate to a target opening degree, an output section configured to supply the first electric actuator with a drive current that matches with the first requested drive current and supply the second electric actuator with a drive current that matches with the second requested drive current, a learning section, and a correction section. The learning section configured to: perform a first learning process that changes a first drive current, which is supplied to the first electric actuator, in a stepwise manner from a state where the first wastegate is stationary in a given first standstill position and learns, as a first learning value, an amount of change in the first drive current that is made until the first wastegate is determined to be moved; and perform a second learning process that changes a second drive current, which is supplied to the second electric actuator, in a stepwise manner from a state where the second wastegate is stationary in a given second standstill position and learns, as a second learning value, an amount of change in the second drive current that is made until the second wastegate is determined to be moved. The correction section is configured to correct the first requested drive current based on the first learning value and correct the second requested drive current based on the second learning value.

This configuration learns, as a learning value, the amount of change in the drive current that is required to start moving each of the first and second wastegates. This configuration also corrects the requested drive current for each of the wastegates based on the corresponding learning value. It is thus possible to supply each wastegate with the drive current that is determined considering the responsiveness of the wastegate to the drive current. Consequently, even if the wastegates differ from each other in responsiveness to the drive current, the wastegates are likely to move in the same manner, at the same movement speed and to the same final opening degree.

Example 10

A control method for an internal combustion engine is provided that performs the various processes described in Examples 1 to 9.

Example 11

A non-transitory computer readable memory medium is provided that stores a program that causes a processing device to perform the various processes described in Examples 1 to 9.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings:

FIGS. 4A and 4B are flowcharts showing the procedure of a closing learning process for the engine of FIG. 1;

FIGS. 5A and 5B are flowcharts showing the procedure of an opening learning process for the engine of FIG. 1;

DETAILED DESCRIPTION

A controller for an internal combustion engine E according to one embodiment will be described with reference to FIGS. 1 to 11. First, the schematic configuration of the internal combustion engine E will be described.

Figure 1:
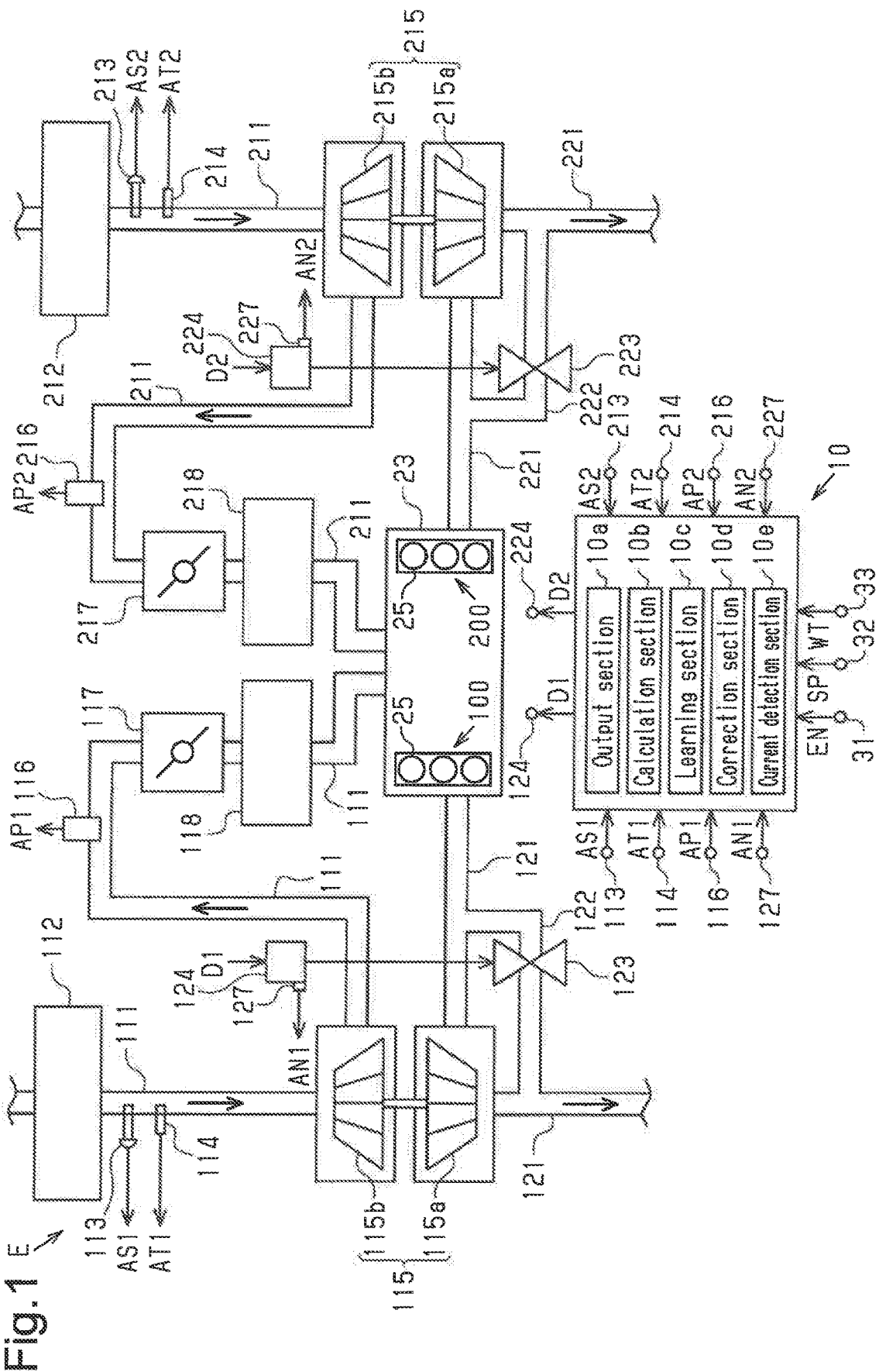
FIG. 1 is a schematic view showing an internal combustion engine of one embodiment according to the present disclosure.

The internal combustion engine E is a V engine. As shown in FIG. 1, the engine body 23 of the internal combustion engine E has a first bank 100, which includes three cylinders 25 arranged in line. The engine body 23 also has a second bank 200, which includes three cylinders 25 arranged in line.

The internal combustion engine E includes a first intake passage 111 for entry of intake air from the outside. The first intake passage 111 is connected to the cylinders 25 of the first bank 100 in the engine body 23. A mixture of fuel and intake air is combusted in each cylinder 25. The cylinders 25 of the first bank 100 are connected to a first exhaust passage 121 for discharging exhaust gas to the outside.

The first intake passage 111 includes a first air cleaner 112, which filters the air in the first intake passage 111. The first intake passage 111 includes a first air flow meter 113, which is arranged downstream of the first air cleaner 112 in the intake flow to detect the amount of intake air. The first intake passage 111 includes a first temperature sensor 114, which is arranged downstream of the first air flow meter 113 to detect the temperature of intake air.

A first forced-induction device 115 is arranged downstream of the first temperature sensor 114 in the intake flow in the first intake passage 111. The first forced-induction device 115 is located in both of the first intake passage 111 and the first exhaust passage 121. The section of the first forced-induction device 115 located in the first exhaust passage 121 includes a first turbine 115a, which is rotated by the exhaust stream. The section of the first forced-induction device 115 located in the first intake passage 111 includes a compressor 115b, which is rotated by the rotation of the first turbine 115a and sends intake air to the engine body 23.

The first intake passage 111 includes a first pressure sensor 116, which is arranged downstream of the first forced-induction device 115 to measure the pressure of intake air. The first intake passage 111 includes a first throttle valve 117, which is arranged downstream of the first pressure sensor 116 to adjust the flow path area of the first intake passage 111. The first intake passage 111 includes a first intercooler 118, which is arranged downstream of the first throttle valve 117 to cool the intake air.

The first exhaust passage 121 includes a first bypass passage 122 that bypasses the first turbine 115a of the first forced-induction device 115. The first bypass passage 122 connects the section of the first exhaust passage 121 upstream of the first turbine 115a of the first forced-induction device 115 in the exhaust flow to the downstream section. The first bypass passage 122 includes a first wastegate 123. The first wastegate 123 is a swing valve, which opens and closes the flow path of the first bypass passage 122. The opening and closing of the wastegate 123 increase and reduce the amount of exhaust gas bypassing the first turbine 115a of the first forced-induction device 115 through the first bypass passage 122, thereby increasing and reducing the boost pressure. In the present embodiment, the opening degree is 100% when the first wastegate 123 fully opens the flow path of the first bypass passage 122, and the opening degree is 0% when the first wastegate 123 completely closes the flow path of the first bypass passage 122.

The first wastegate 123 is driven by a first electric actuator 124, which is a motor-driven actuator. The first electric actuator 124 includes a rod, which is moved by the driving force of a motor. The rod is coupled to the first wastegate 123 by a coupling mechanism (not shown). The first electric actuator 124 is supplied with a first drive current D1 from an electronic control unit 10 (hereinafter referred to as an ECU 10), which is the controller (control device) of the internal combustion engine E. When a positive first drive current D1 is supplied to the first electric actuator 124, the first wastegate 123 receives an urging force that moves the first wastegate 123 in the closing direction, which reduces the opening degree of the first wastegate 123. When a negative first drive current D1 is supplied to the first electric actuator 124, the first wastegate 123 receives an urging force that moves the first wastegate 123 in the opening direction, which increases the opening degree of the first wastegate 123. The exhaust pressure urges the first wastegate 123 in the opening direction, which increases the opening degree. The combination of the exhaust pressure and the magnitude of the first drive current D1 supplied to the first electric actuator 124 determines the opening degree of the first wastegate 123. When the first wastegate 123 is not under exhaust pressure and the first drive current is zero, the first wastegate 123, which may be at any opening degree, is held at this opening degree, in other words, the first wastegate 123 remains stationary. To avoid being affected by the heat of exhaust gas, the first electric actuator 124 is located near the compressor 115b of the first forced-induction device 115, instead of the first turbine 115a of the first forced-induction device 115.

A first opening degree sensor 127 is mounted to the first electric actuator 124 to detect the opening degree of the first wastegate 123. To avoid being affected by the heat of exhaust gas, the first opening degree sensor 127 is mounted to the first electric actuator 124, instead of being arranged adjacent to the first wastegate 123. The first opening degree sensor 127 detects the opening degree of the first wastegate 123 based on the position of the rod of the first electric actuator 124.

The first bank 100 of the internal combustion engine E is structured as described above.

The structure of the second bank 200 of the internal combustion engine E is now described. The structures of the first bank 100 and the second bank 200 are symmetrical in the internal combustion engine E. As such, only the general outline of the second bank 200 is given below, and the overlapping parts are not described in detail. The internal combustion engine E includes a second intake passage 211 and a second exhaust passage 221, which are connected to the cylinders 25 of the second bank 200 in the engine body 23. The second intake passage 211 includes a second air cleaner 212, a second air flow meter 213, a second temperature sensor 214, a compressor 215b of a second forced-induction device 215, a second pressure sensor 216, a second throttle valve 217, and a second intercooler 218, which are arranged in this order from the upstream to downstream in the intake flow. The second exhaust passage 221 includes a second turbine 215a of the second forced-induction device 215. The second exhaust passage 221 includes a second bypass passage 222 that bypasses the second turbine 215a of the second forced-induction device 215. The second bypass passage 222 includes a second wastegate 223, which opens and closes the flow path of the second bypass passage 222. The second wastegate 223 is driven by a second electric actuator 224. The second electric actuator 224 is supplied with a second drive current D2 from the ECU 10. The combination of the magnitude of the second drive current D2 and the exhaust pressure determines the opening degree of the second wastegate 223. A second opening degree sensor 227 is mounted to the second electric actuator 224. The second opening degree sensor 227 detects the opening degree of the second wastegate 223 based on the position of the rod of the second electric actuator 224. The functions of the components of the second bank 200 are the same as those of the components of the first bank 100.

The ECU 10 controls the internal combustion engine E. The ECU 10 receives detection values from various sensors arranged in the internal combustion engine E and the vehicle in which the internal combustion engine E is installed. Specifically, the ECU 10 receives signals of the first intake air amount AS1, which is detected by the first air flow meter 113, the first intake air temperature AT1, which is detected by the first temperature sensor 114, the first intake air pressure AP1, which is detected by the first pressure sensor 116, and the first opening degree AN1, which is detected by the first opening degree sensor 127. In addition, the ECU 10 receives signals of the second intake air amount AS2, which is detected by the second air flow meter 213, the second intake air temperature AT2, which is detected by the second temperature sensor 214, the second intake air pressure AP2, which is detected by the second pressure sensor 216, and the second opening degree AN2, which is detected by the second opening degree sensor 227. Furthermore, the ECU 10 receives signals from various sensors, such as a rotation sensor 31, which detects the engine rotation speed EN, a vehicle speed sensor 32, which detects the vehicle speed SP of the vehicle in which the internal combustion engine E is installed, and a water temperature sensor 33, which detects the water temperature WT in the water jacket of the engine body 23.

The ECU 10 includes an output section 10a, which controls the first and second electric actuators 124 and 224. The output section 10a supplies a first drive current D1, which drives the first electric actuator 124, to the first electric actuator 124, and supplies a second drive current D2, which drives the second electric actuator 224, to the second electric actuator 224.

The ECU 10 includes a current detection section 10e, which detects the magnitudes of the first and second drive currents D1 and D2 that are supplied by the output section 10a. The ECU 10 includes a calculation section 10b, which calculates the drive current for moving the first and second wastegates 123 and 223 to the target opening degree. The calculation section 10b performs a calculation process to calculate a first requested drive current D1W, which is used to move the first wastegate 123 to the target opening degree, according to the boost pressure required for the first bank 100. In this calculation, the calculation section 10b first estimates the exhaust pressure in the first exhaust passage 121 based on the parameters such as the first intake air amount AS1 and the engine rotation speed EN. Then, the calculation section 10b calculates, as a first requested drive current D1W, the drive current required to move the first wastegate 123 to the target opening degree, based on the exhaust pressure in the first exhaust passage 121. The calculation section 10b calculates the first requested drive current D1W under the assumption that there is no dead band, which is the current value range to which the first wastegate 123 does not respond when the first drive current D1 is applied to the stationary first wastegate 123.

The calculation section 10b also performs a calculation process to calculate a second requested drive current D2W for moving the second wastegate 223 to the target opening degree, according to the boost pressure required for the second bank 200. Specifically, the calculation section 10b first estimates the exhaust pressure in the second exhaust passage 221 based on the factors such as the second intake air amount AS2 and the engine rotation speed EN. Then, the calculation section 10b calculates, as a second requested drive current D2W, the drive current required to move the second wastegate 223 to the target opening degree, based on the exhaust pressure in the second exhaust passage 221. The calculation section 10b calculates the second requested drive current D2W under the assumption that there is no dead band, which is the current value range to which the second wastegate 223 does not respond when the second drive current D2 is applied to the stationary second wastegate 223.

The ECU 10 also includes a learning section 10c, which learns the responsiveness of the first and second wastegates 123 and 223. The learning section 10c performs a first learning process, which changes the first drive current D1 in a stepwise manner from a state where the first wastegate 123 is stationary in a given standstill position and learns, as a learning value, the amount of change in the first drive current D1 that is made until the first wastegate 123 is determined to be moved. That is, the learning section 10c learns the current value required to move the first wastegate 123 from standstill. This current value is the magnitude of the drive current required to overcome the static friction, which is generated when the first wastegate 123 and the first electric actuator 124 start moving from standstill. The first learning process includes an opening learning process, which learns a first opening learning value by changing the first drive current D1 so as to increase the opening degree of the first wastegate 123, and a closing learning process, which learns a first closing learning value by changing the first drive current D1 so as to reduce the opening degree of the first wastegate 123.

The learning section 10c changes the first drive current D1, which is supplied from the output section 10a, in a stepwise manner corresponding to the operation of the first learning process. The period between the point in time at which the learning section 10c changes the first drive current D1 by one step and the point in time at which the learning section 10c changes the first drive current D1 again is referred to as one step period. The length of one step period is predetermined and may be several milliseconds. The first one-third of one step period is set as a delay period, in which determination on whether the first wastegate 123 is moved is not performed. The rest of one step period is set as a calculation period, in which determination on whether the first wastegate 123 is moved is performed.

When the first wastegate 123 is moved by a given opening degree or more in the calculation period, the learning section 10c determines that the first wastegate 123 is moved. When determining that the first wastegate 123 is moved, the learning section 10c learns, as a learning value, the difference between the average value of the first drive current D1 supplied in the calculation period and the value of the first drive current D1 supplied while the first wastegate 123 is stationary. This difference is calculated based on the current value detected by the current detection section 10e.

The learning section 10c stores an opening learning completion flag, which indicates completion of an opening learning process. The learning section 10c also stores a closing learning completion flag, which indicates completion of a closing learning process. While the ignition switch is off, the opening and closing learning completion flags are both OFF. When the ignition switch is turned on, the learning section 10c performs an opening learning process and then switches the opening learning completion flag from OFF to ON when completing the opening learning process. In addition, when the ignition switch is turned on, the learning section 10c performs a closing learning process and then switches the closing learning completion flag from OFF to ON when completing the closing learning process. When the ignition switch is turned off, the learning section 10c sets the opening and closing learning completion flags back to OFF.

The period between when the ignition switch is turned on and when it is turned off is referred to as one trip. The learning section 10c stores a both-process completion flag, which indicates that an opening learning process and a closing learning process are both completed during one trip. While the ignition switch is off, this both-process completion flag is set to 0. The learning section 10c switches the both-process completion flag from 0 to 1 when the opening learning completion flag is switched from OFF to ON and the closing learning completion flag is also switched from OFF to ON during one trip. When the ignition switch is turned off, the learning section 10c sets the both-process completion flag back to 0.

The learning section 10c also performs a second learning process, which changes the second drive current D2 in a stepwise manner from a state where the second wastegate 223 is stationary in a given standstill position and learns, as a learning value, the amount of change in the second drive current D2 that is made until the second wastegate 223 is determined to be moved. The second learning process includes an opening learning process, which learns a second opening learning value by changing the second drive current D2 so as to increase the opening degree of the second wastegate 223, and a closing learning process, which learns a second closing learning value by changing the second drive current D2 so as to reduce the opening degree of the second wastegate 223. In the same manner as the first learning process, the learning section 10c stores an opening learning completion flag, a closing learning completion flag, and a both-process completion flag for the second learning process. Further, in the same manner as the first learning process, the learning section 10c also changes the second drive current D2, which is supplied from the output section 10a, in a stepwise manner corresponding to the operation of the second learning process. The learning section 10c determines whether the second wastegate 223 is moved in a calculation period in one step period, which is defined in the same manner as in the first learning process. When determining that the second wastegate 223 is moved, the learning section 10c learns as a learning value the difference between the average value of the second drive currents D2 supplied in the calculation period and the value of the second drive current D2 supplied while the second wastegate 223 is stationary.

The learning section 10c performs a first reference-position setting process, which correlates the detection value of the first opening degree sensor 127 with the actual opening degree of the first wastegate 123. The learning section 10c performs a second reference-position setting process, which correlates the detection value of the second opening degree sensor 227 with the actual opening degree of the second wastegate 223.

The ECU 10 includes a correction section 10d, which corrects the values of requested drive currents for the first and second wastegates 123 and 223 based on the learning values. The correction section 10d performs a correction process that corrects the first requested drive current D1W based on the first opening learning value and the first closing learning value. Specifically, the correction section 10d corrects the first requested drive current D1W to the value that includes the current value required to start moving the first wastegate 123 from standstill. The correction section 10d also performs a correction process that corrects the second requested drive current D2W based on the second opening learning value and the second closing learning value. Specifically, the correction section 10d corrects the second requested drive current D2W to the value that includes the current value required to start moving the second wastegate 223 from standstill.

The reference-position setting process and the learning process performed by the learning section 10c are now described. When the ignition switch is turned on, the learning section 10c performs reference-position setting processes and learning processes. The learning section 10c first performs reference-position setting processes when the ignition switch is turned on. The learning section 10c then performs learning processes.

The learning section 10c concurrently performs a first reference-position setting process for the first bank 100 and a second reference-position setting process for the second bank 200. In addition, the learning section 10c concurrently performs a first learning process for the first bank 100 and a second learning process for the second bank 200. The first and second reference-position setting processes are substantially the same process except that they are performed for different banks. Likewise, the first and second learning processes are substantially the same process except that they are performed for different banks. Thus, only the first reference-position setting process and the first learning process are described below, and the second reference-position setting process and the second learning process are not described.

Figure 2:
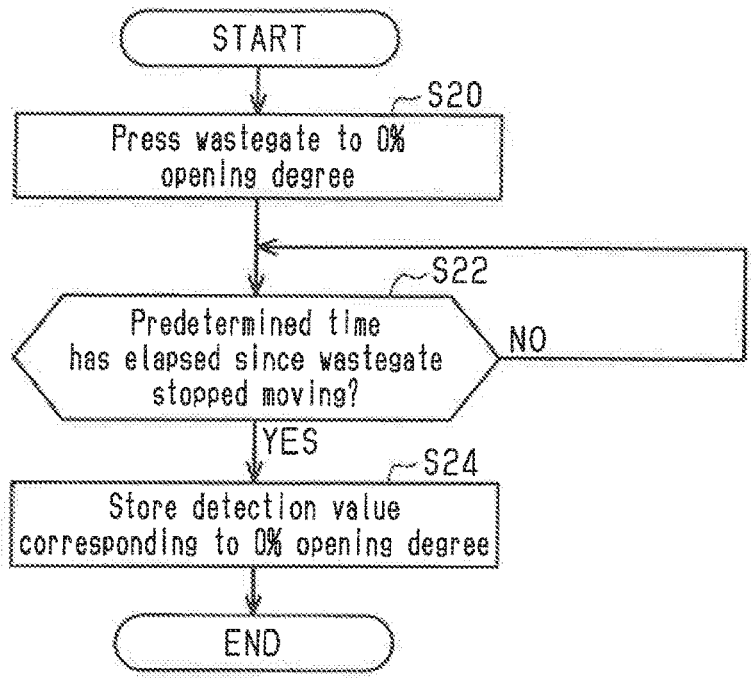
FIG. 2 is a flowchart showing the procedure of a reference-position setting process for the engine of FIG. 1.

As shown in FIG. 2, when starting a first reference-position setting process, the learning section 10c proceeds to step S20. At step S20, the learning section 10c adjusts the first drive current D1, which is supplied from the output section 10a, so that the first wastegate 123 is pressed to the position with an opening degree of 0%. The learning section 10c then proceeds to step S22.

At step S22, the learning section 10c determines whether a predetermined time (e.g., 1 second) has elapsed since the first wastegate 123 stopped moving. If the predetermined time has not elapsed since the first wastegate 123 stopped moving (step S22: NO), the learning section 10c performs step S22 again. The learning section 10c repeats step S22 until the predetermined time has elapsed with the first wastegate 123 remaining stationary. When the predetermined time has elapsed with the first wastegate 123 remaining stationary (step S22: YES), the learning section 10c proceeds to step S24.

At step S24, the learning section 10c stores a fully closed state detection value, which is the detection value of the first opening degree sensor 127 obtained when the first wastegate 123 is stationary. The learning section 10c then ends the first reference-position setting process. In the subsequent process, the ECU 10 calculates the opening degree of the first wastegate 123 based on the detection value of the first opening degree sensor 127, assuming that the fully closed state detection value corresponds to the position of the first wastegate 123 with an opening degree of 0%.

When following execution conditions (i) to (iii) are satisfied while the ignition switch is on, the learning section 10c performs a first learning process.

(i) The first reference-position setting process is complete.
(ii) The learning conditions are satisfied.
(iii) The both-process completion flag is 0.

The learning conditions include four conditions (A) to (D) below.

(A) The first wastegate 123 is maintained at a fixed target opening degree within the range of intermediate opening degrees (opening degrees of 25% to 75%).

(B) The exhaust pressure exerted on the first wastegate 123 is low. Specifically, the first intake air amount AS1 is less than or equal to the predetermined value.

(C) The first wastegate 123 and the first electric actuator 124 are unlikely to vibrate. Specifically, the engine rotation speed EN, the vehicle speed SP, and the first intake air amount AS1 are all less than or equal to the respective predetermined values. For example, learning condition (C) is satisfied when the vehicle is idling.

(D) The temperatures of the first wastegate 123 and the first electric actuator 124 are relatively high. Specifically, the water temperature WT in the engine body 23, the integrated first intake air amount AS1 that has been detected since the ignition switch was turned on, and the first intake air temperature AT1 are all less than or equal to the respective predetermined values.

Figure 7:
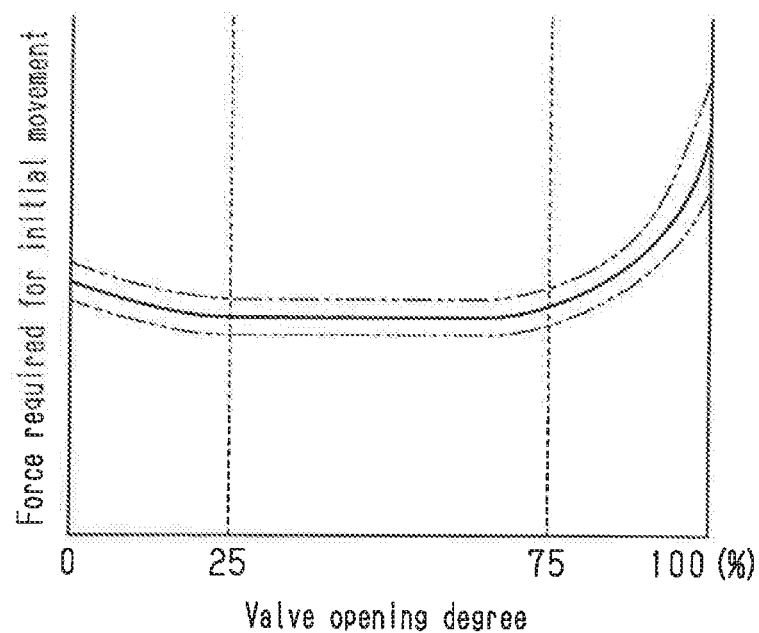
FIG. 7 is a diagram showing the relationship between the opening degree of the wastegate and the force required to start moving the wastegate in the engine of FIG. 1.

The relation between learning condition (A) and a learning process is now described. FIG. 7 shows the relationship between the opening degree of a wastegate used in the present embodiment and the magnitude of force required to move the wastegate by a given opening degree from the state where the wastegate is stationary with a given opening degree and does not receive any exhaust pressure. Specifically, this force is the output torque of the motor of the electric actuator. This relationship depends on the characteristics of the coupling mechanism located between the wastegate and the electric actuator. The relationship is substantially the same as long as the same coupling mechanism is used. However, as indicated by the dashed double-dotted lines in FIG. 7, the magnitude of force may vary with any change in the static friction caused by aging of the wastegate or the electric actuator or any variations in static friction of wastegates.

As shown in FIG. 7, when the first wastegate 123 is stationary with an opening degree of 25% to 75%, the magnitude of force required to move this first wastegate 123 is substantially uniform regardless of the opening degree of the first wastegate 123. When the first wastegate 123 is stationary with an opening degree of 0% to 25%, the magnitude of force required to move this first wastegate 123 is substantially the same as the magnitude of force required when the first wastegate 123 is stationary with an opening degree of 25% to 75%. When the first wastegate 123 is stationary with an opening degree of 0% to 25%, the magnitude of force required to move this first wastegate 123 is slightly greater for a smaller opening degree. When the first wastegate 123 is stationary with an opening degree of 75% to 100%, the magnitude of force required to move this first wastegate 123 increases with the degree of opening degree.

The magnitude of force required to start moving the first wastegate 123 corresponds to the amount of change in the first drive current D1 that is required to start moving the first wastegate 123, which is learned as a learning value. When the magnitude of force required to move the first wastegate 123 is uniform regardless of the opening degree of the first wastegate 123, such as when the opening degree of the first wastegate 123 is from 25% to 75%, the learning value obtained in a learning process performed at a position within this range of opening degrees is usable as the learning value for any other position within this range. As such, the learning value obtained in a learning process performed while the first wastegate 123 is stationary with an opening degree of 25% to 75% is usable for any opening degree of the first wastegate 123 in the range of 25% to 75%.

The force required to start moving the first wastegate 123 when the opening degree of the first wastegate 123 is from 0% to 25% is slightly greater than the force required when the opening degree is from 25% to 75%. However, in terms of obtaining the current value used to correct the first requested drive current D1W, the difference between these ranges and the corresponding difference in the first drive currents D1 are within tolerable error margins. In other words, the learning value obtained when the opening degree of the first wastegate 123 is from 25% to 75% may be used as the learning value for the first wastegate 123 with an opening degree of 0% to 25% without causing any problem in correcting the first requested drive current D1W.

Figure 8:
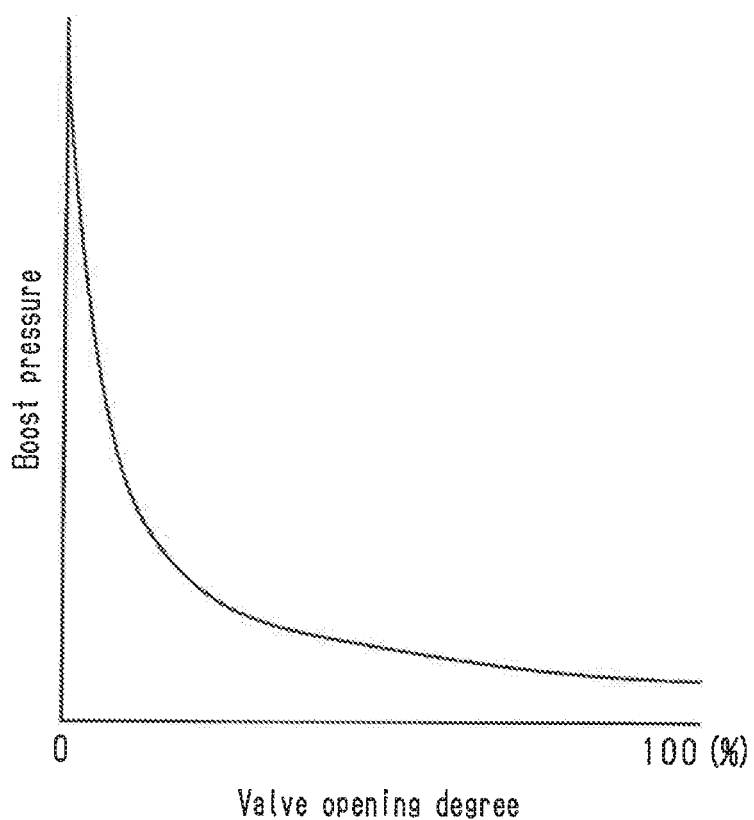
FIG. 8 is a diagram showing the relationship between the opening degree of the wastegate and the boost pressure in the engine of FIG. 1.

The force required to start moving the first wastegate 123 with an opening degree of 75% to 100% increases with the opening degree of the first wastegate 123. Particularly, the first wastegate 123 with an opening degree of near 100% requires a greater force to start moving than the first wastegate 123 with an opening degree of 25% to 75%. Thus, the learning value obtained when the opening degree of the first wastegate 123 is from 25% to 75% could be considered unsuitable as the learning value for the first wastegate 123 with an opening degree of 75% to 100%. However, as shown in FIG. 8, when the opening degree of the first wastegate 123 is from 75% to 100%, the boost pressure is low and less affected by the opening degree. Consequently, even though the learning value does not precisely correspond to the magnitude of the static friction, this does not cause any problem in controlling the boost pressure. As such, the learning value obtained when the opening degree of the first wastegate 123 is from 25% to 75% may be used as the learning value for the first wastegate 123 with an opening degree of 75% to 100% without causing any problem.

As described above, a learning process performed while the first wastegate 123 is stationary with an opening degree of 25% to 75% provides a learning value that is usable for the entire opening degree range of the first wastegate 123.

The relation between learning condition (B) and a learning process is now described. When the exhaust pressure is large, a large force presses the first wastegate 123 toward a greater opening degree. This may accelerate the movement of the first wastegate 123 when it is about to move in the opening direction according to the first drive current D1. The exhaust pressure may also limit the movement of the first wastegate 123 when it is about to move in the closing direction. A learning value obtained when learning condition (B) is satisfied is least affected by movement of the first wastegate 123 caused by the exhaust pressure.

The relation between learning condition (C) and a learning process is now described. A learning process learns the current value that is required to move the first wastegate 123 from standstill. This current value is the magnitude of the drive current required for the first wastegate 123 and the first electric actuator 124 to overcome the static friction. Any vibration of the first wastegate 123 and the first electric actuator 124 during a first learning process causes this learning process to obtain a learning value that corresponds to the dynamic friction of the first wastegate 123 and the first electric actuator 124. The dynamic friction is typically smaller than static friction. Thus, any vibration of the first wastegate 123 and the first electric actuator 124 during a first learning process may result in learning of a value that is smaller than the learning value that should be learned and corresponds to the static friction. By learning a learning value when learning condition (C) is satisfied, it is possible to learn an appropriate learning value that corresponds to the static friction.

The relation between learning condition (D) and a learning process is now described. A high water temperature WT in the engine body 23 indicates that the temperature of the engine body 23 and the temperatures of the first wastegate 123 and the first electric actuator 124, which are located near the engine body 23, are probably high. When the integrated first intake air amount AS1 is large, the amount of accumulated heat generated by combustion is large, so that the temperatures of the first wastegate 123 and the first electric actuator 124 are probably high. Further, a first intake air temperature AT1 that is greater than or equal to the predetermined value indicates that the outside temperature is high and that the temperatures of the first wastegate 123 and the first electric actuator 124 are probably high. These parameters reflect the temperatures of the first wastegate 123 and the first electric actuator 124. When a learning value is obtained with the temperatures of the first wastegate 123 and the first electric actuator 124 relatively high, the viscosity of the lubricating grease is unlikely to be too high to obtain an appropriate learning value.

Figure 3:
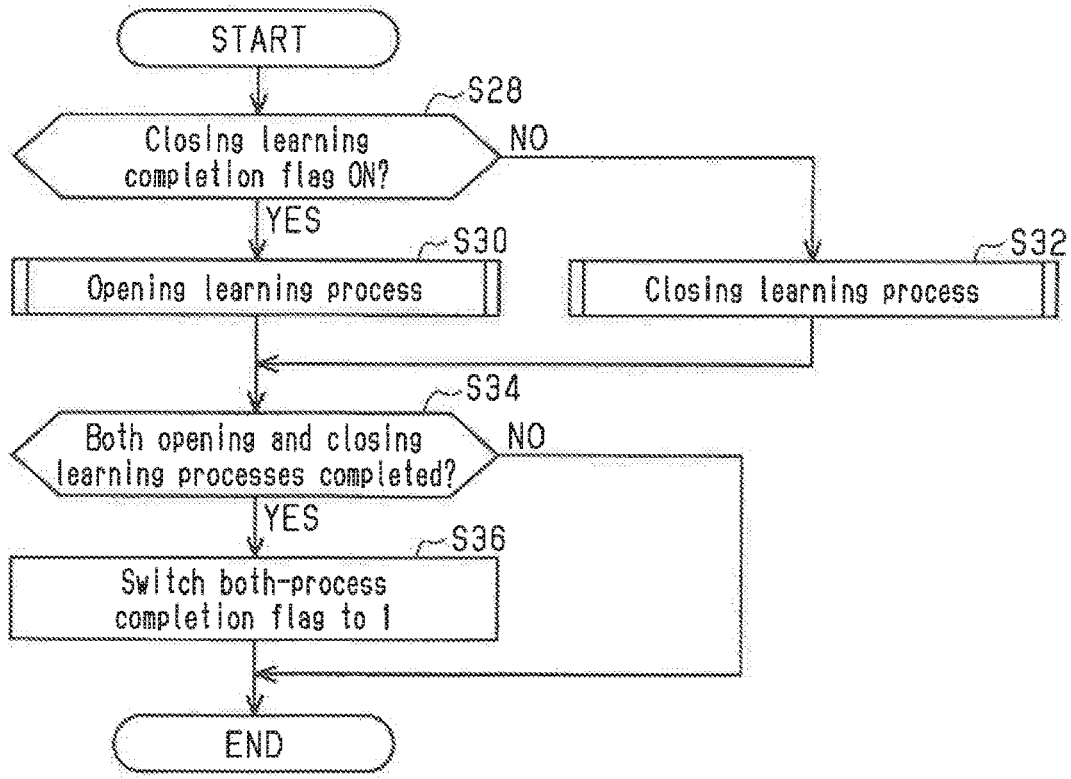
FIG. 3 is a flowchart showing the procedure of a first learning process for the engine of FIG. 1.

When execution conditions (i) to (iii) are satisfied, the learning section 10c starts a first learning process as shown in FIG. 3. When starting a first learning process, the learning section 10c proceeds to step S28. At step S28, the learning section 10c determines whether the closing learning completion flag is ON. If the closing learning completion flag is OFF (step S28: NO), the learning section 10c proceeds to step S32 and performs a closing learning process. If the closing learning completion flag is ON (step S28: YES), the learning section 10c proceeds to step S30 and performs an opening learning process. As is evident from step S28, the learning section 10c performs a closing learning process first. That is, the learning section 10c gives priority to a closing learning process over an opening learning process.

After performing step S32 or step S30, the learning section 10c proceeds to step S34. At step S34, the learning section 10c determines whether the closing and opening learning completion flags are both switched from OFF to ON during one trip. If the result of this determination is NO, the learning section 10c ends the first learning process. If the result of this determination is YES, the learning section 10c proceeds to step S36. At step S36, the learning section 10c switches the both-process completion flag from 0 to 1. The learning section 10c then ends the first learning process. When any of learning conditions (A) to (D) becomes unsatisfied during the first learning process, the learning section 10c stops the first learning process in the middle.

The learning section 10c performs a first learning process each time when execution conditions (i) to (iii) are satisfied. As is evident from execution condition (iii), the learning section 10c repeats the first learning process until a closing learning process and an opening learning process are both completed during one trip. If the ignition switch is turned off while a first learning process is performed, the learning section 10c ends the first learning process.

Figure 4B:
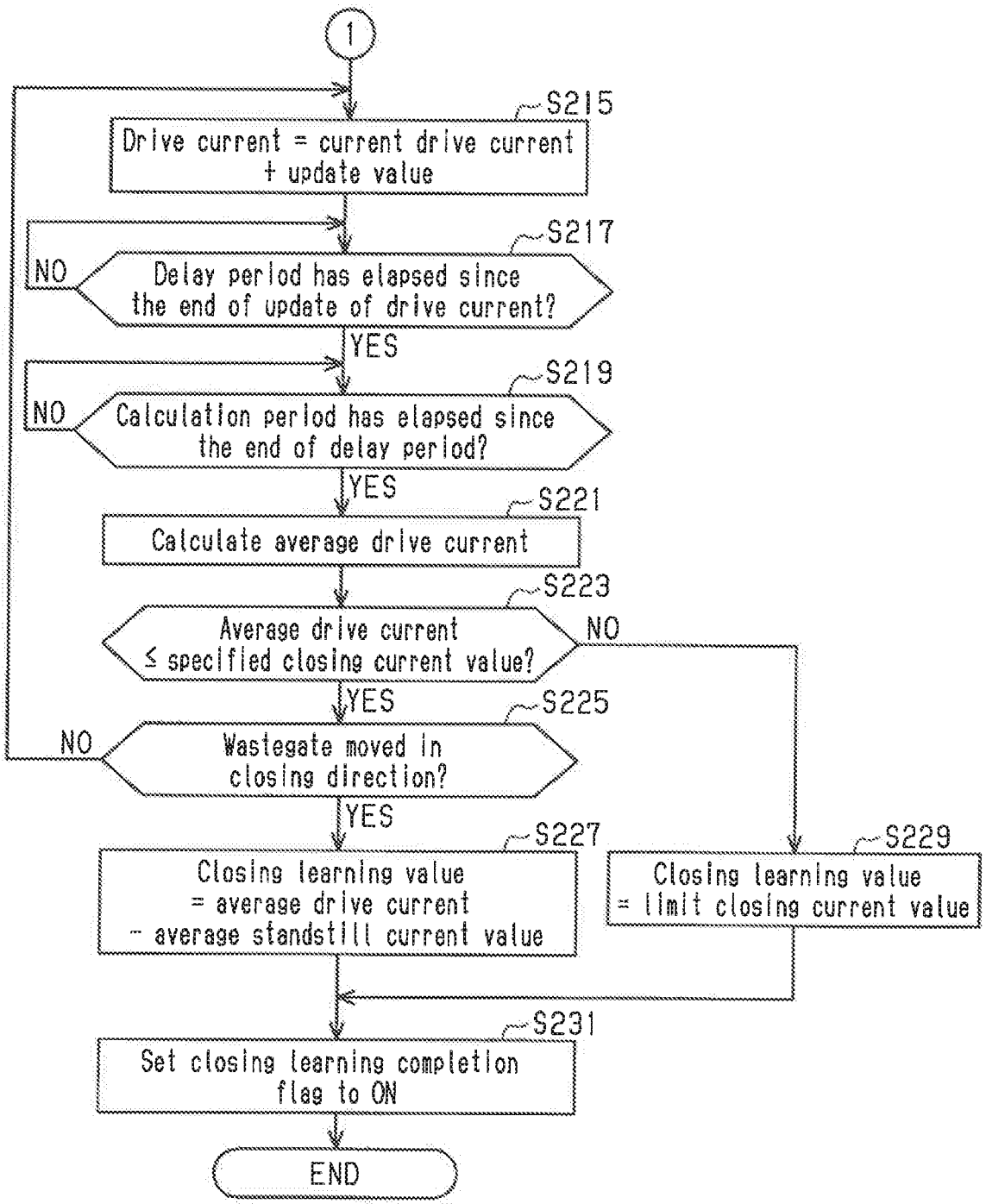

Referring to FIGS. 4A and 4B, a closing learning process is now described. In summary, a closing learning process increases the first drive current in a stepwise manner from a state where the first wastegate 123 is stationary, and learns, as a first closing learning value, the amount of change in the first drive current D1 that is made until the first wastegate 123 is determined to be moved in the closing direction by a given opening degree or more. The first closing learning value is calculated as a positive value. A position in which the first wastegate 123 is stationary is hereinafter referred to as a standstill position. In addition, the value of current that is supplied to the first electric actuator 124 by the output section 10a of the ECU 10 when the first wastegate 123 is stationary in the standstill position is referred to as a standstill current value. When learning condition (B) is satisfied, the standstill current value is 0. A specific period from the start of a first learning process in which the first wastegate 123 remains in the standstill position is referred to as a standstill period. The average of the current value detected by the current detection section 10e in this standstill period is referred to as an average standstill current value. The standstill period has a length of several milliseconds, for example, and ends before an opening learning process starts (step S30 in FIG. 3).

When starting a closing learning process, the learning section 10c proceeds to step S201. At step S201, the learning section 10c determines whether the first closing learning value has been updated in a predetermined set period (e.g., one day). If the first closing learning value has not been updated in the set period (step S201: NO), the learning section 10c proceeds to step S203. If the first closing learning value has been updated in the set period (step S201: YES), the learning section 10c proceeds to step S207.

At step S203, the learning section 10c sets a predetermined first update value as an update value, which is the amount of change in the first drive current D1 that is made per step when the first drive current D1 is changed in a stepwise manner. The first update value is a positive value. The learning section 10c then proceeds to step S205. At step S205, the learning section 10c sets a change starting current value, which is used as the initial value when the first drive current D1 is changed in a stepwise manner. Specifically, the learning section 10c sets the standstill current value as the change starting current value.

At step S207, the learning section 10c sets a second update value as the update value, which is the amount of change in the first drive current D1 that is made per step when the first drive current D1 is changed in a stepwise manner. The second update value is a positive value smaller than the first update value. The learning section 10c then proceeds to step S209. At step S209, the learning section 10c sets a change starting current value, which is used as the initial value when the first drive current D1 is changed in a stepwise manner. Specifically, the learning section 10c sets the change starting current value using Equation (1) below.

Change starting current value=standstill current value+previous first closing learning value×$AA$ (1)

Coefficient AA is a positive value smaller than 1, for example, 0.8. As is evident from Equation (1), the previous first closing learning value is factored in the change starting current value with coefficient AA.

After step S205 or step S209, the learning section 10c proceeds to step S211. At step S211, the learning section 10c sets a specified closing current value, which is used as the upper limit when the first drive current D1 is increased in a stepwise manner. The present embodiment has a predetermined limit closing current value, which is the maximum value for a first closing learning value. This limit closing current value is factored in the specified closing current value. The learning section 10c uses Equation (2) below to set the specified closing current value.

Specified closing current value=average standstill current value+limit closing current value (2)

After step S211, the learning section 10c proceeds to step S213. At step S213, the learning section 10c changes the first drive current D1, which is supplied from the output section 10a, to the change starting current value. When the learning section 10c proceeds to step S213 after performing step S205, the first drive current D1 remains at the standstill current value. When the learning section 10c proceeds to step S213 after performing step S209, the first drive current D1 is changed in a single step from the standstill current value to the change starting current value, in which the previous closing learning value is factored. After step S213, the learning section 10c proceeds to step S215.

At step S215, the learning section 10c changes the first drive current D1, which is supplied from the output section 10a, according to the update value. Specifically, the learning section 10c sets, as a new first drive current DIN, a value obtained by adding the update value to the current first drive current D1. Then, the output section 10a supplies the new first drive current DIN. After step S215, the learning section 10c proceeds to step S217.

At step S217, the learning section 10c determines whether the delay period has elapsed since the first drive current D1 was updated. If the delay period has not been elapsed (step S217: NO), the learning section 10c performs step S217 again. The learning section 10c repeats step S217 until the delay period has elapsed. When the delay period has elapsed (step S217: YES), the learning section 10c proceeds to step S219.

At step S219, the learning section 10c determines whether the calculation period has elapsed since the delay period ended. If the calculation period has not been elapsed (step S219: NO), the learning section 10c performs step S219 again. The learning section 10c repeats step S219 until the calculation period has elapsed. When the calculation period has elapsed (step S219: YES), the learning section 10c proceeds to step S221.

At step S221, the learning section 10c calculates an average first drive current D1V based on the current value detected by the current detection section 10e. The average first drive current D1V is the average value of the first drive current D1 in the calculation period. The learning section 10c then proceeds to step S223.

At step S223, the learning section 10c determines whether the average first drive current D1V is less than or equal to the specified closing current value. If the average first drive current DIV is less than or equal to the specified closing current value (step S223: YES), the learning section 10c proceeds to step S225.

At step S225, the learning section 10c determines whether the first wastegate 123 is moved in the closing direction. The learning section 10c uses the detection value of the first opening degree sensor 127 for this determination.

Specifically, the learning section 10c determines whether the difference in opening degree of the first wastegate 123 between the start and the end of the calculation period is greater than or equal to the given opening degree. If the difference in opening degree of the first wastegate 123 between the start and the end of the calculation period is greater than or equal to the given opening degree, the learning section 10c determines that the first wastegate 123 is moved in the closing direction. If not, the learning section 10c determines that the first wastegate 123 is not moved. When determining that the first wastegate 123 is not moved in the closing direction (step S225: NO), the learning section 10c returns to step S215.

Then, the learning section 10c repeats steps S215 to S225. Repeating steps S215 to S225 increases the new first drive current D1N in a stepwise manner. While steps S215 to S225 are repeated, if it is determined at step S223 that the average first drive current D1V exceeds the specified closing current value, in other words, the average first drive current D1V becomes higher than the specified closing current value (step S223: NO), the learning section 10c proceeds to step S229. If it is determined at step S225 that the first wastegate 123 is moved in the closing direction before the average first drive current DIV exceeds the specified closing current value, the learning section 10c proceeds to step S227.

If the learning section 10c proceeds to step S229, the limit closing current value is set as the first closing learning value. That is, the upper limit value for a first closing learning value is used as the first closing learning value. If the learning section 10c proceeds to step S227, the value obtained by subtracting the average standstill current value from the average first drive current DIV is set as the first closing learning value. The learning section 10c then sets the closing learning completion flag to ON at step S231. Then, the learning section 10c ends the procedure of closing learning process.

Figure 5B:
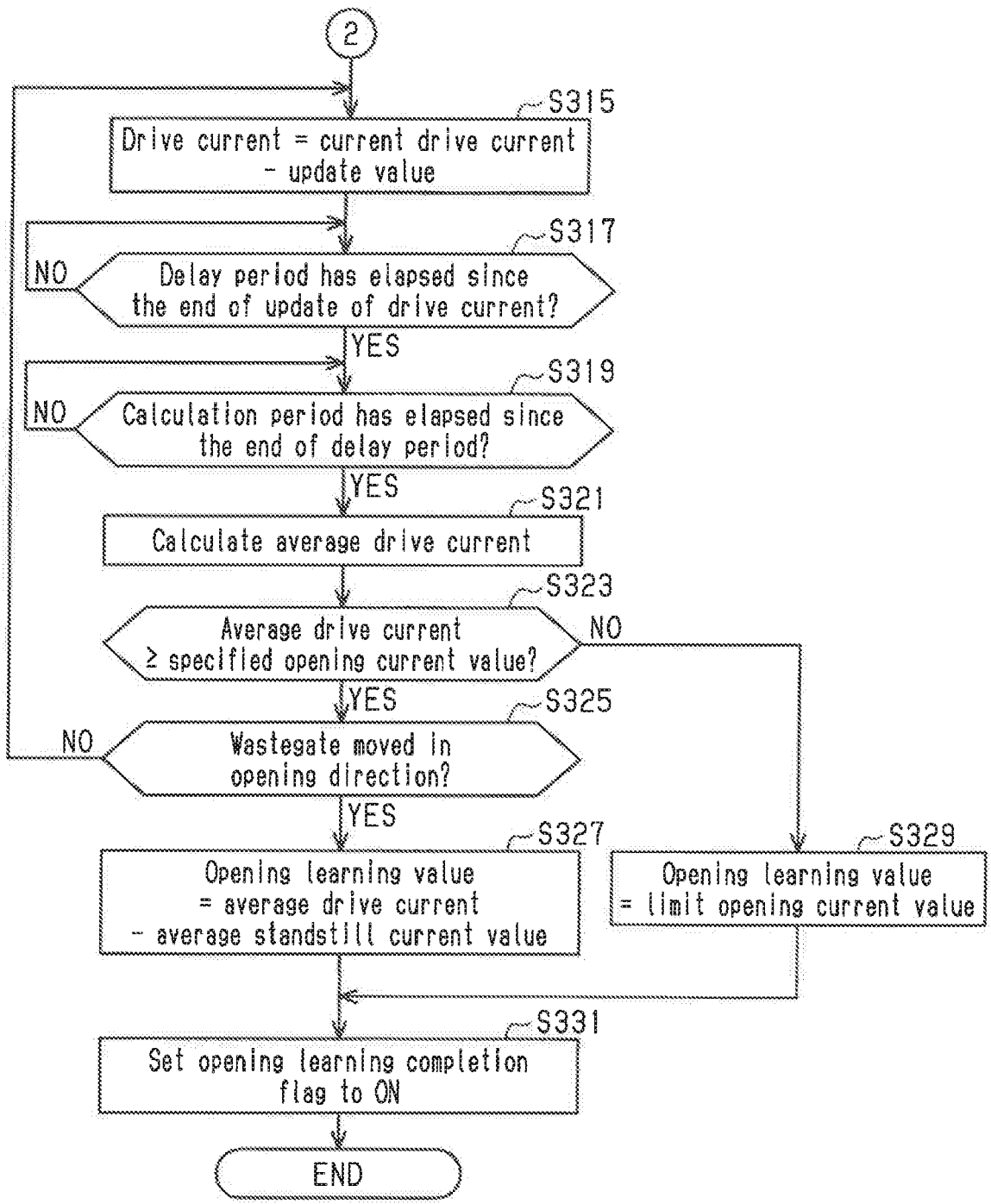

Referring to FIGS. 5A and 5B, an opening learning process is now described. The general principle of the opening learning process is the same as the closing learning process. The opening learning process reduces the first drive current D1 in a stepwise manner and learns, as a first opening learning value, the amount of change in the first drive current D1 that is made until the first wastegate 123 is determined to be moved in the opening direction. The first opening learning value is calculated as a negative value.

When starting an opening learning process, the learning section 10c proceeds to step S301. At step S301, the learning section 10c determines whether the first opening learning value has been updated in a set period (e.g., one day). If the first opening learning value has not been updated in the set period (step S301: NO), the learning section 10c proceeds to step S303. If the first opening learning value has been updated in the set period (step S301: YES), the learning section 10c proceeds to step S307.

If the learning section 10c proceeds to step S303, a first update value is set as the update value of the first drive current D1. This first update value is set to the same value as in the closing learning process. Then, at step S305, the learning section 10c sets the standstill current value as the change starting current value.

If the learning section 10c proceeds to step S307, a second update value is set as the update value of the first drive current D1. The second update value is set to the same value as in the closing learning process and is a positive value smaller than the first update value. Then, the learning section 10c sets the change starting current value at step S309. The learning section 10c uses Equation (3) below to set the change starting current value.

Change starting current value=standstill current value+previous first opening learning value×B (3)

Coefficient B is a positive value smaller than 1. In the present embodiment, coefficient B is set to 0.8 as with coefficient AA.

After step S305 or S309, the learning section 10c proceeds to step S311. At step S311, the learning section 10c sets a specified opening current value, which is used as the lower limit when the first drive current D1 is reduced in a stepwise manner. The present embodiment has a predetermined limit opening current value, which is the minimum value for a first opening learning value. The limit opening current value is a negative value. The absolute value of the limit opening current value is the same as the limit closing current value. The learning section 10c uses Equation (4) below to set the specified opening current value.

Specified opening current value=average standstill current value+limit opening current value (4)

After step S311, the learning section 10c changes the first drive current D1, which is supplied from the output section 10a, to the change starting current value at step S313. The learning section 10c then proceeds to step S315.

At step S315, the learning section 10c sets, as a new first drive current D1N, the value obtained by subtracting the update value from the current first drive current D1. The output section 10a supplies the new first drive current D1N. The learning section 10c then proceeds to step S317. The learning section 10c repeats step S317 until the delay period has elapsed. When the delay period has elapsed (step S317: YES), the learning section 10c proceeds to step S319. The learning section 10c repeats step S319 until the calculation period has elapsed. When the calculation period has elapsed (step S319: YES), the learning section 10c proceeds to step S321.

At step S321, the learning section 10c calculates the average first drive current D1V based on the current value detected by the current detection section 10e. Then, at step S323, the learning section 10c determines whether the average first drive current D1V is greater than or equal to the specified opening current value. If the average first drive current D1V is greater than or equal to the specified opening current value (step S323: YES), the learning section 10c proceeds to step S325. At step S325, the learning section 10c determines whether the first wastegate 123 is moved in the opening direction. If the difference in opening degree of the first wastegate 123 between the start and the end of the calculation period is greater than or equal to the given opening degree, the learning section 10c determines that the first wastegate 123 is moved in the opening direction. If not, the learning section 10c determines that the first wastegate 123 is not moved. When determining that the first wastegate 123 is not moved in the opening direction (step S325: NO), the learning section 10c returns to step S315. Then, the learning section 10c repeats steps S315 to S325. Repeating steps S315 to S325 reduces the new first drive current D1N in a stepwise manner.

While steps S315 to S325 are repeated, if it is determined at step S323 that the renewed average first drive current D1V becomes less than the specified opening current value, in other words, the average first drive current D1V becomes lower than the specified opening current value (step S323: NO), the learning section 10c proceeds to step S329. If it is determined at step S325 that the first wastegate 123 is moved in the opening direction before the average first drive current D1V becomes less than the specified closing current value, the learning section 10c proceeds to step S327.

If the learning section 10c proceeds to step S329, the limit opening current value is set as the first opening learning value. If the learning section 10c proceeds to step S327, the value obtained by subtracting the average standstill current value from the average first drive current D1V is set as the first opening learning value. The first opening learning value is a negative value. The learning section 10c then sets the opening learning completion flag to ON at step S331. The learning section 10c then ends the procedure of opening learning process.

Figure 6:
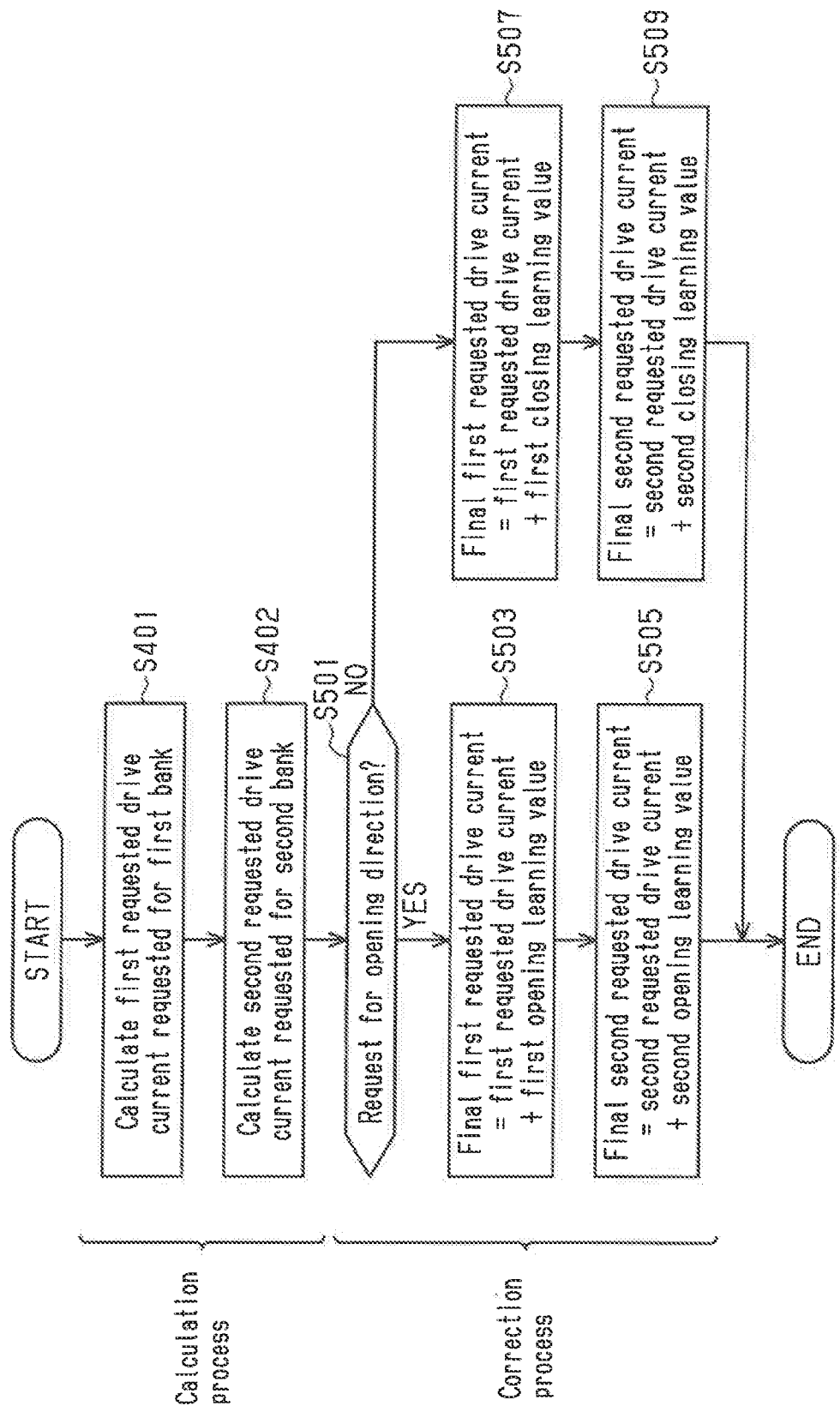
FIG. 6 is a flowchart showing the procedure of a calculation process and a correction process for the engine of FIG. 1.

Referring to FIG. 6, the calculation process performed by the calculation section 10b of the ECU 10 and the correction process performed by the correction section 10d are now described. The ECU 10 identifies the boost pressures for the first and second banks 100 and 200 based on the detection values of the first and second pressure sensors 116 and 216. Then, the ECU 10 sends a request command for boost pressure to the calculation section 10b when required. The calculation section 10b performs a calculation process each time a request command for boost pressure is received.

When starting a process, the calculation section 10b proceeds to step S401. At step S401, the calculation section 10b calculates the first requested drive current D1W that corresponds to the boost pressure requested for the first bank 100. Specifically, the calculation section 10b first estimates the exhaust pressure in the first exhaust passage 121. Based on this exhaust pressure, the calculation section 10b then calculates, as the first requested drive current D1W, the drive current that is required to move the first wastegate 123 to the target opening degree. The calculation section 10b then proceeds to step S402. At step S402, the calculation section 10b calculates the second requested drive current D2W that corresponds to the boost pressure requested for the second bank 200. Specifically, the calculation section 10b first estimates the exhaust pressure in the second exhaust passage 221. Based on this exhaust pressure, the calculation section 10b then calculates, as the second requested drive current D2W, the drive current that is required to move the second wastegate 223 to the target opening degree. In the present embodiment, the target opening degree of the second wastegate 223 is the same as that of the first wastegate 123. Steps S401 and S402 constitute the calculation process.

When the calculation section 10b completes step S402, the correction section 10d starts a correction process. Specifically, the correction section 10d performs step S501. At step S501, the correction section 10d determines whether the request command for boost pressure is issued to move the first and second wastegates 123 and 223 in the opening direction. If the result of this determination is YES, the correction section 10d proceeds to step S503. In this case, a correction process associated with the opening direction is performed. If the result of this determination is NO, the correction section 10d proceeds to step S507. In this case, a correction process associated with the closing direction is performed.

At step S503, the correction section 10d corrects the first requested drive current D1W. Specifically, the correction section 10d sets, as the final first requested drive current D1Wa, the value obtained by adding the first opening learning value to the first requested drive current D1W calculated at step S401. The first opening learning value is a negative value. The correction section 10d then proceeds to step S505.

At step S505, the correction section 10d corrects the second requested drive current D2W. Specifically, the correction section 10d sets, as the final second requested drive current D2Wa, the value obtained by adding the second opening learning value to the second requested drive current D2W calculated at step S402. The second opening learning value is a negative value.

If the correction section 10d proceeds to step S507 from step S501, the correction section 10d corrects the first requested drive current D1W. Specifically, the correction section 10d sets, as the final first requested drive current D1Wa, the value obtained by adding the first closing learning value to the first requested drive current D1W calculated at step S401. The correction section 10d then proceeds to step S509.

At step S509, the correction section 10d corrects the second requested drive current D2W. Specifically, the correction section 10d sets, as the final second requested drive current D2Wa, the value obtained by adding the second closing learning value to the second requested drive current D2W calculated at step S402. The correction section 10d then ends the process. Steps S501 to S509 constitute the correction process.

After the correction section 10d completes the process, the output section 10a of the ECU 10 simultaneously changes the first drive current D1 and the second drive current D2 for supplying to the values that match with the final first requested drive current D1Wa and the final second requested drive current D2Wa, respectively, which are updated in the correction process.

The operation and advantages of the present embodiment are now described.

Figure 9:
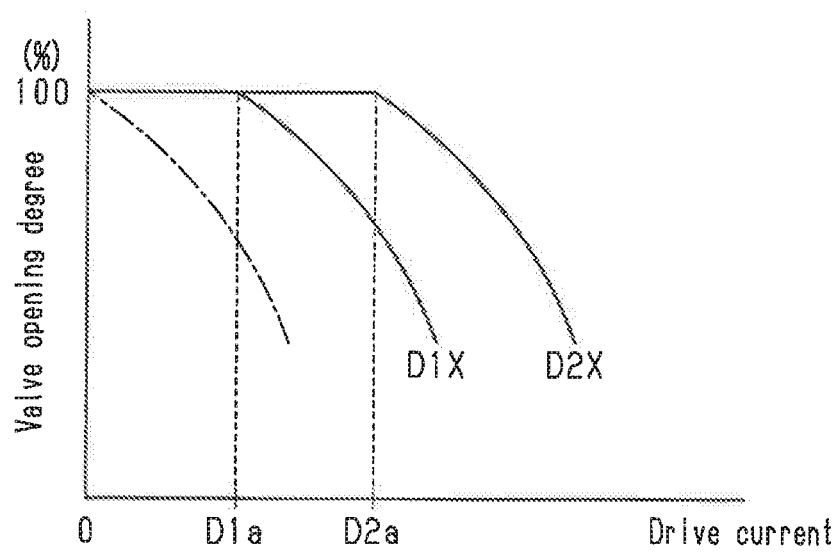
FIG. 9 is a diagram showing the relationship between the drive current and the opening degree of the wastegate in the engine of FIG. 1.

(1) When the first drive current D1 applied to the stationary first wastegate 123 is changed under a condition where the exhaust pressure remains unchanged, there may be a dead band, which is the current value range to which the first wastegate 123 does not respond. FIG. 9 shows an example of the relationship between the first drive current D1 and the opening degree of the first wastegate 123 under a condition where the exhaust pressure remains unchanged. The dashed dotted line in FIG. 9 shows an example in which the first wastegate 123 does not have a dead band. In this example, the first wastegate 123 with an opening degree of 100% is moved in the direction that reduces the opening degree. When the first drive current D1 is applied, the first wastegate 123 that does not have a dead band moves according to the magnitude of the first drive current D1. The solid line D1X in FIG. 9 shows an example in which the first wastegate 123 has a dead band. In this case, when the applied first drive current D1 is less than the current value D1$a$, the first wastegate 123 does not move from an opening degree of 100%. When the applied first drive current D1 is greater than the current value D1$a$, the first wastegate 123 moves in the direction that reduces the opening degree. That is, the first wastegate 123 requires a first drive current D1 that is greater than the current value D1$a$ to start moving.

The dead band results from factors such as the friction generated when the first wastegate 123 and the first electric actuator 124 move from standstill (static friction) and presence of deposits. When the first wastegate 123 has the dead band, the magnitude of current effective to move the first wastegate 123 from standstill is the amount of current obtained by subtracting the current value D1$a$ from the first drive current D1, which correspond to the force that overcomes the cause of the dead band, such as the static friction. If the first requested drive current D1W is determined without considering the magnitude of the static friction and the associated current value D1$a$, that is, if the first requested drive current D1W is determined without considering the responsiveness of the first wastegate 123 to the first drive current D1, problems may occur such as a decrease in the moving speed of the first wastegate 123 and deviation of the final opening degree from the target opening degree. These problems prevent accurate control of the boost pressure.

To solve these problems, in the present embodiment, the learning section 10$c$ of the ECU 10 learns, as a learning value, the amount of change in the first drive current D1 that is required to start moving the first wastegate 123 from standstill. The correction section 10$d$ corrects the first requested drive current D1W using the learning value. For example, the first closing learning value may be the current value D1$a$ described above. In this case, the correction section 10$d$ sets, as the final first requested drive current D1Wa, the value obtained by adding the current value D1$a$ to the first requested drive current D1W. That is, the responsiveness of the first wastegate 123 to the first drive current D1 is factored in the final first requested drive current D1Wa. The output section 10$a$ supplies the first electric actuator 124 with the first drive current D1 that matches with the final first requested drive current D1Wa. The present embodiment thus enables the first wastegate 123 to move at the intended speed and to the target opening degree. This achieves accurate control of the boost pressure for the first bank 100.

(2) The responsiveness of the first wastegate 123 to the first drive current D1 can differ from the responsiveness of the second wastegate 223 to the second drive current D2. The solid line D2X in FIG. 9 shows an example of the relationship between the second drive current D2 and the second wastegate 223 that has a dead band. To move the second wastegate 223 with an opening degree of 100% in the direction that reduces the opening degree, the second drive current D2 needs to be greater than the current value D2$a$. The current value D2$a$ is greater than the current value D1$a$. That is, the first wastegate 123 and the second wastegate 223 differ in responsiveness to the drive current. Consequently, if the first and second requested drive currents D1W and D2W are set to the same value, the first and second wastegates 123 and 223 will have different final opening degrees. In this case, the amount of exhaust flowing through the first turbine 115$a$ of the first bank 100 will be different from that for the second turbine 215$a$ of the second bank 200, resulting in the first and second banks 100 and 200 having different boost pressures.

The present embodiment separately learns the amount of change in drive current that is required to start moving each of the first and second wastegates 123 and 223. The present embodiment corrects the first and second requested drive currents D1W and D2W based on the obtained learning values. The output section 10$a$ supplies the first drive current D1 and the second drive current D2 that match with the corrected first requested drive current D1W and the second requested drive current D2W, respectively. This enables the first and second wastegates 123 and 223 to move at the same speed and to the same final opening degree. The present embodiment thus limits any difference in boost pressure between the first bank 100 and the second bank 200.

(3) When a learning process is performed under a condition where the learning value has been updated in the set period, the learning value obtained in this learning process is likely to be similar to the previous learning value. In this case, it is advantageous to start a learning process using a current value that is relatively close to the drive current corresponding to the previous learning value to shorten the time required for the learning process. In contrast, when a learning process is performed under a condition where the learning value has not been updated in the set period, the learning value obtained in this learning process may significantly differ from the previous learning value. In this case, the previous learning value should not be factored in the initial value for this learning process because this may prevent obtainment of an appropriate learning value. For example, if the previous learning value is factored in the initial value, the drive current at the start of the learning process may already be greater than the learning value that should be obtained in this learning process. As such, when the learning value has not been updated in the set period, a new learning value needs to be obtained without using the previous value. In this case, it is advantageous to increase the update amount used in the learning process to shorten the time required for the learning process.

Figure 10:
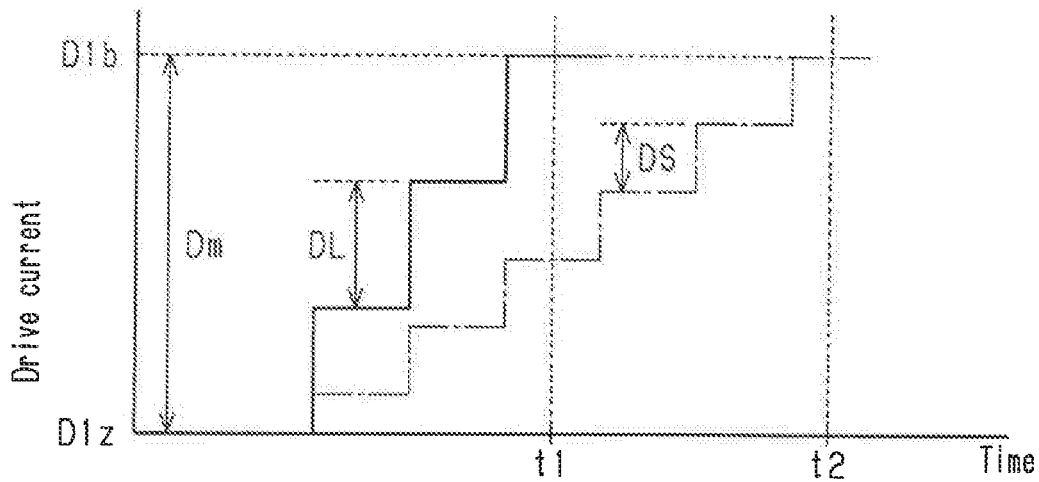
FIG. 10 is a time chart showing the time variation in the drive current during a closing learning process for the engine of FIG. 1.

In this respect, the present embodiment uses the following configuration. As shown in FIG. 10, to perform a closing learning process under a condition where the first closing learning value has not been updated in the set period, the learning section 10$c$ sets the update value of the first drive current D1 to the first update value DL, which is greater than the second update value DS. The learning section 10$c$ increases the first drive current D1 by the first update value DL per step from the standstill current value D1$z$. As shown in FIG. 10, when the update value is set to the first update value DL, the amount of change in the first drive current D1 per step in this learning process is larger than when the update value is set to the second update value DS. Accordingly, when the first drive current D1 is increased in a stepwise manner in the learning process, the first drive current D1 becomes closer to the current value D1$b$, which corresponds to the learning value Dm, in fewer steps. As a result, the time t1 required for the learning process with the first update value DL is shorter than the time t2 required for the learning process with the second update value DS. The same applies to the opening learning process.

Closing and opening learning processes are performed when all learning conditions (A) to (D) are satisfied. In one trip, there are only limited occasions where all learning conditions (A) to (D) are satisfied. Reducing the time required for a learning process as described above allows the first closing learning value and the first opening learning value to be updated within a limited time period.

Figure 11:
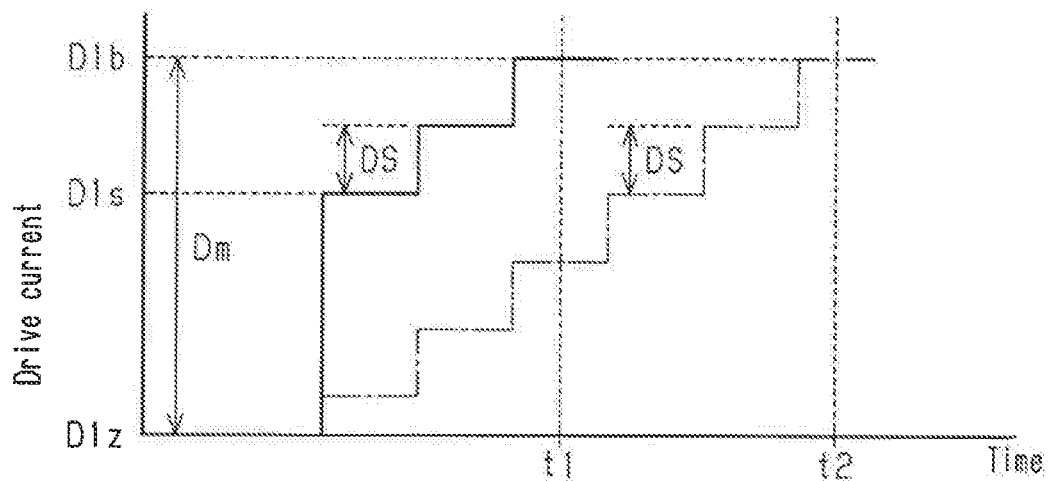
FIG. 11 is a time chart showing the time variation in the drive current during a closing learning process for the engine of FIG. 1.

(4) To perform a closing learning process under a condition where the first closing learning value has been updated in the set period, the learning section 10c factors the learning value that have been obtained into the change starting current value. As shown in FIG. 11, the learning section 10c changes the first drive current D1 from the standstill current value d1z to the change starting current value D1s in a single step and uses this first drive current D1 as the initial value for the learning process. That is, the first drive current D1 is changed directly to a value that is relatively close to the current value D1b, which corresponds to the learning value Dm. This shortens the time required to obtain the final learning value. That is, the time t1 required for this learning process is shorter than the time t2 required for a learning process that uses the standstill current value D1z as the initial value. The same applies to the opening learning process.

To perform a learning process under a condition where the first closing learning value or the first opening learning value has been updated in the set period, the learning section 10c sets the update value of the first drive current D1 to the second update value DS. As described above, the second update value DS is smaller than the first update value DL. The use of a smaller update amount increases the accuracy of the learning value.

(5) When the first wastegate 123 is stationary, there are narrow gaps between the parts that couple the first electric actuator 124 to the coupling mechanism, between parts of the coupling mechanism, and between the parts that couple the coupling mechanism to the first wastegate 123. When the first drive current D1 is applied to the first electric actuator 124 while the first wastegate 123 is stationary, these parts first move in turn to positions that fill the gaps between them. This movement changes the detection value of the first opening degree sensor 127. However, the first wastegate 123 is still stationary at this time. That is, immediately after the first drive current D1 is changed by one step in a learning process, the detection value of the first opening degree sensor 127 may change due to the movement of the parts that fill the gaps between them while the first wastegate 123 is still stationary. As such, the period in which the parts move only to fill the gaps between them is preferably excluded from the period in which it is determined whether the first wastegate 123 is moved.

In this respect, the configuration described above has the delay period before the calculation period, in which it is determined whether the first wastegate 123 is moved. Setting the delay period provides a period in which the parts move only to fill the gaps between them before the determination of movement of the first wastegate 123 starts. The determination of movement of the first wastegate 123 is performed in the calculation period after the delay period. This reduces the possibility that the first wastegate 123 is erroneously determined to be moved due to a change in the detection value of the first opening degree sensor 127 caused by the movement of the parts that only fills the gaps between them.

(6) The current value detected by the current detection section 10e tends to fluctuate immediately after the first drive current D1 is changed. When a learning process is performed, there is a short time lag before the current value becomes stable after the first drive current D1 is changed by one step.

The configuration described above has the delay period before the calculation period, providing a period in which the current value becomes stable. The determination of movement of the first wastegate 123 is performed in the calculation period after the delay period, allowing the determination to be performed when the current value is relatively stable.

(7) In the calculation period after the delay period, although the first drive current D1 detected by the current detection section 10e is relatively stable, the first drive current D1 may still fluctuate due to noise or other factors. If the amount of change in the first drive current D1 is calculated using the first drive current D1 that is detected by the current detection section 10e at a specific point in time in the calculation period, for example, the fluctuation of the first drive current D1 may excessively increase or reduce the amount of change in the first drive current D1, which is to be learned as a learning value. This may lead to a greater error in the learning value. In this respect, the present embodiment uses the average value of the first drive current D1 in the calculation period to calculate the amount of change in the first drive current D1, which is used as the learning value. The use of the average value results in a learning value that is less affected by the error corresponding to the fluctuation of the first drive current D1 caused by noise, for example.

(8) Problems, such as trapped foreign matter, may prevent the first wastegate 123 from operating normally. In this case, when the first drive current D1 is increased in a stepwise manner in a learning process, the first wastegate 123 may fail to move even when the first drive current D1 exceeds the current value that would otherwise move the first wastegate 123. This may result in a learning value being abnormal or impossible to obtain. In this respect, the present embodiment uses the limit closing current value as the learning value when the average first drive current DIV exceeds the specified closing current value, which is predetermined. In addition, the present embodiment uses the limit opening current value as the learning value when the average first drive current D1V becomes less than the specified opening current value, which is predetermined. This prevents the learning value from becoming an abnormal value or impossible to obtain due to any malfunction of the first wastegate 123.

(9) To increase the boost pressure after the ignition switch is turned on, the flow path of the first bypass passage 122 is closed by moving the first wastegate 123 to a smaller opening degree. This increases the amount of exhaust flowing to the first turbine 115a, thereby increasing the boost pressure. As shown in FIG. 8, when the first wastegate 123 closes the flow path of the first bypass passage 122, especially when the first bypass passage 122 is about to be fully closed, the amount of exhaust flowing to the first turbine 115a and thus the boost pressure increase rapidly. As such, when the first wastegate 123 is moved to a smaller opening degree to close the flow path of the first bypass passage 122, any deviation from the intended opening degree of first wastegate 123 will hinder accurate control of the boost pressure when the boost pressure is increased. Thus, the above configuration gives priority to a closing learning process over an opening learning process and first updates the closing learning value when the ignition switch is turned on. Thus, a more recent learning value may be used to reduce the opening degree of the first wastegate 123 to increase the boost pressure. This limits deviation of the opening degree of the first wastegate 123.

(10) The learning section 10c performs both closing and opening learning processes. Thus, for both of the cases when the opening degree of the first wastegate 123 is reduced and when the opening degree of the first wastegate 123 is increased, the requested drive currents are calculated considering the responsiveness of the first wastegate 123 to the first drive current D1. This allows the opening degree of the first wastegate 123 to be controlled accurately when the opening degree of the first wastegate 123 is either reduced or increased.

(11) The learning section 10c performs closing and opening learning processes when the opening degree of the first wastegate 123 is from 25% to 75%. When the opening degree of the first wastegate 123 is from 25% to 75%, the magnitude of force required to move the first wastegate 123, that is, the first drive current D1 required to move the first wastegate 123, is substantially uniform regardless of the opening degree of the first wastegate 123 (see FIG. 7). As such, once a learning value is obtained in a learning process performed when the opening degree of the first wastegate 123 is from 25% to 75%, this learning value may be used for the entire range of 25% to 75% of the opening degree of the first wastegate 123. The first wastegate 123 with an opening degree of 25% to 75% and the first wastegate 123 with an opening degree of 0% to 25% require a similar magnitude of force to start moving. As such, a learning value obtained in a learning process when the opening degree of the first wastegate 123 is from 25% to 75% may be used as a learning value for the first wastegate 123 with an opening degree of 0% to 25%. Further, the boost pressure that is generated when the opening degree of the first wastegate 123 is from 75% to 100% is low and less affected by the opening degree. Thus, even though the learning value does not precisely correspond to the magnitude of the static friction, this does not cause any problem in controlling the boost pressure. As such, the learning value obtained in a learning process when the opening degree of the first wastegate 123 is from 25% to 75% may be used as the learning value for the first wastegate 123 with an opening degree of 75% to 100%.

As described above, a learning process performed while the first wastegate 123 is stationary with an opening degree of 25% to 75% obtains a learning value that is usable for the entire opening degree range of the first wastegate 123. This eliminates the need for storing a learning value for each opening degree.

(12) The learning section 10c performs closing and opening learning processes while the exhaust pressure exerted on the first wastegate 123 is low. A larger exhaust pressure exerted on the first wastegate 123 increases the force that presses the first wastegate 123 in the direction that increases the opening degree. This may accelerate the movement of the first wastegate 123 when it is about to move in the opening direction according to the first drive current D1. The exhaust pressure may also limit the movement of the first wastegate 123 when it is about to move in the closing direction. In this respect, the present embodiment obtains a learning value that is least affected by movement of the first wastegate 123 caused by the exhaust pressure.

(13) The learning section 10c performs closing and opening learning processes while the first wastegate 123 and the first electric actuator 124 are unlikely to vibrate. A learning process that is performed when the first wastegate 123 and the first electric actuator 124 easily vibrate may result in a learning value that corresponds to the dynamic friction of the first wastegate 123 and the first electric actuator 124. The dynamic friction is typically smaller than the static friction. Thus, any vibration of the first wastegate 123 and the first electric actuator 124 during a first learning process may result in learning of a value that is smaller than the learning value that should be learned and corresponds to the static friction. In this respect, the present embodiment obtains an appropriate learning value that corresponds to the static friction.

(14) The learning section 10c performs closing and opening learning processes while the temperatures of the first wastegate 123 and the first electric actuator 124 are relatively high. Lower temperatures of the first wastegate 123 and the first electric actuator 124 increase the viscosity of the grease used for smooth movement of the first wastegate 123 and the rod of the first electric actuator 124, thereby limiting the movement of the first wastegate 123 and the rod of the first electric actuator 124. In this respect, the present embodiment obtains a learning value while the first wastegate 123 and the rod of the first electric actuator 124 move smoothly.

The above-described embodiment may be modified as follows. The following modifications can be combined as long as the combined modifications remain technically consistent with each other.

The structure of the internal combustion engine E may be modified as long as the internal combustion engine E includes a forced-induction device, a bypass passage, a wastegate, an electric actuator, and an ECU and is capable of performing the learning, calculation, and correction processes.

The internal combustion engine E does not have to be divided into the first bank 100 and the second bank 200. For example, the internal combustion engine E does not have to be a V engine and may be an in-line engine having only one set of a bypass passage and a wastegate. The learning, calculation, and correction processes may be performed for such an internal combustion engine.

After the ignition switch is turned on, an opening learning process may be performed before a closing learning process. In this case, at step S28 in the first learning process shown in FIG. 3, the learning section 10c determines whether the opening learning completion flag is ON. If the result of determination is NO, an opening learning process is performed. If the result of determination is YES, a closing learning process is performed.

Closing and opening learning processes may be performed alternately over multiple trips. Performing closing and opening processes alternately means that one closing learning process from start to completion and one opening learning process from start to completion are performed alternately. That is, a closing learning process is performed if the previous learning process is an opening learning process and this opening learning process is complete. An opening learning process is performed if the previous learning process is a closing learning process and this closing learning process is complete. However, if the previous learning process was terminated before completing, a learning process that is the same as the previous one is performed. That is, when one type of learning process is complete, the learning process to be performed next is switched to the other type of learning process. When closing and opening learning processes are performed alternately, the closing and opening learning completion flags may be set as follows. When the ECU 10 is in an initial state, such as when the vehicle with the internal combustion engine E is driven for the first time, both of the opening and closing learning completion flags are set to OFF. Then, the learning section 10c changes the opening and closing learning completion flags as follows. That is, when completing an opening learning process, the learning section 10c switches the opening learning completion flag from OFF to ON. When completing a closing learning process, the learning section 10c switches the closing learning completion flag from OFF to ON. When the opening and closing learning completion flags are both set to ON, the learning section 10c sets both of the opening and closing learning completion flags back to OFF. When the ignition switch is turned off, the learning section 10c maintains the states of the opening and closing learning completion flags that are stored while the ignition switch is on. The learning section 10c uses the stored information on the opening and closing learning completion flags when the ignition switch is turned on next time. When the first learning process shown in FIG. 3 is performed with the closing and opening learning completion flags set as described above and with learning conditions (A) and (D) satisfied, closing and opening learning processes are performed alternately.

The configuration that gives priority to a closing learning process when the ignition switch is turned on and the configuration that alternates closing and opening learning processes may be combined. For example, when neither of the first closing learning value and the first opening learning value has been updated in a predetermined period, a closing learning process is given priority when the ignition switch is turned on. When both of the first closing learning value and the first opening learning value have been updated in the predetermined period, a closing learning process and an opening learning process are performed alternately. This predetermined period may have a similar length as the set period used for the determination at step S201 of a closing learning process and step S301 of an opening learning process, for example. Likewise, the configuration that gives priority to an opening learning process when the ignition switch is turned on and the configuration that alternates closing and opening learning processes may be combined.

A closing learning process from start to completion and an opening learning process from start to completion may be repeated multiple times during one trip. In this case, the execution conditions include execution conditions (i) and (ii) only.

Only one of the closing learning process and the opening learning process may be performed, and the other may be omitted. Since the opportunities for a learning process are limited, this configuration is effective in increasing the frequency of learning, if one type of learning process has higher importance.

The set period used for the determination at step S201 of a closing learning process is not limited to one day and may be modified as appropriate. To fully enjoy advantages (3) and (4), however, the set period is preferably the longest period that is guaranteed, with high probability, not to cause a significant change in the first closing learning value. Any period from one day to about one month is unlikely to cause a significant change in the first closing learning value. The same applies to the set period used for the determination at step S301 in an opening learning process.

The change starting current value that is set (step S209) when the first closing learning value has been updated in the set period (step S201: YES) may be set to the standstill current value. In this case, to shorten the time required for the learning process, the update value is preferably set to the first update value. The same applies to step S309 of an opening learning process.

For example, there may be a case in which the first closing learning value has been updated in the set period, but not the first opening learning value. In this case, the previous first closing learning value may be factored in the change starting current value of an opening learning process. The same applies to the closing learning process.

Figure 12A:
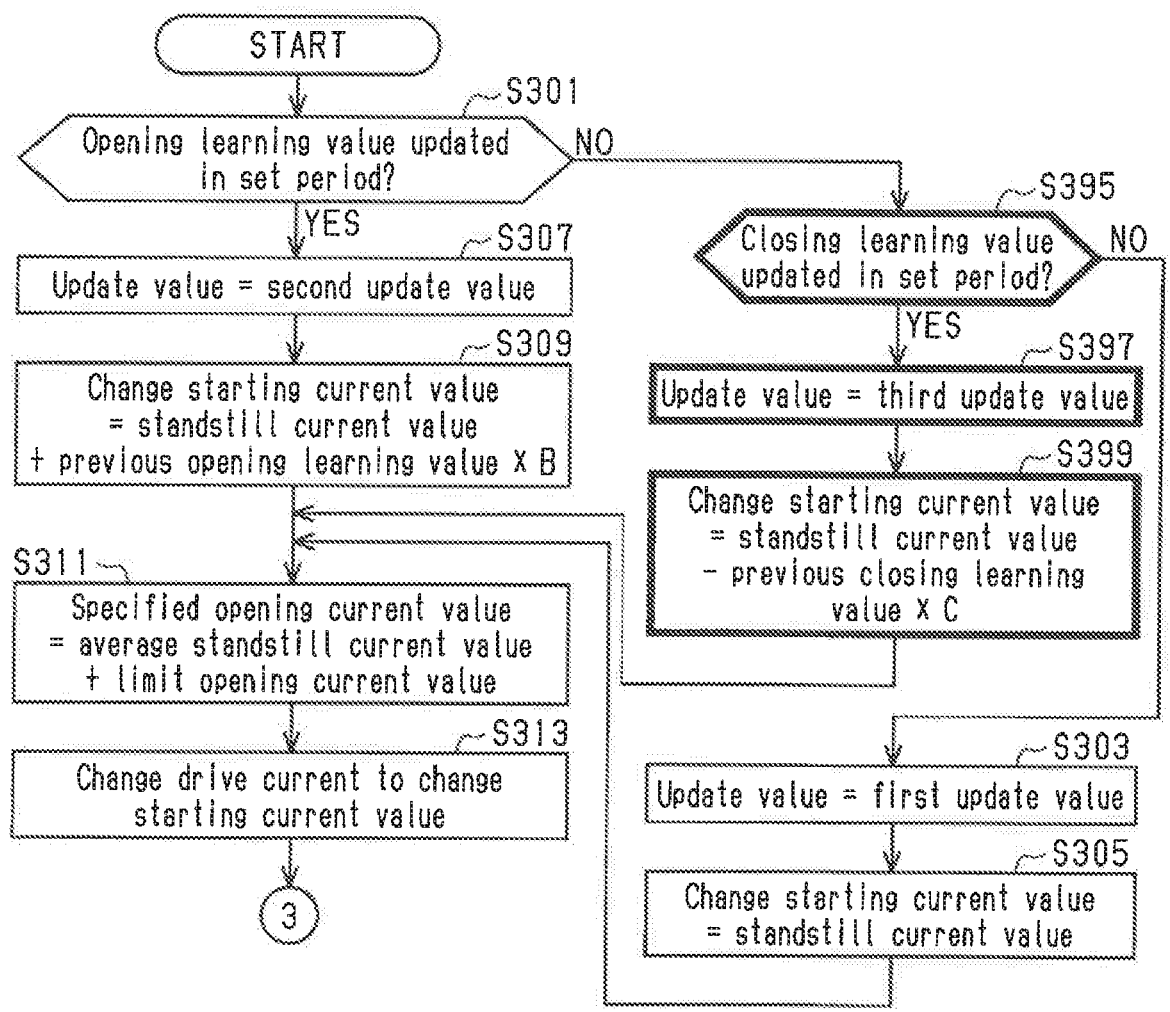
FIGS. 12A and 12B are flowcharts showing an opening learning process of a modification.
Figure 12B:
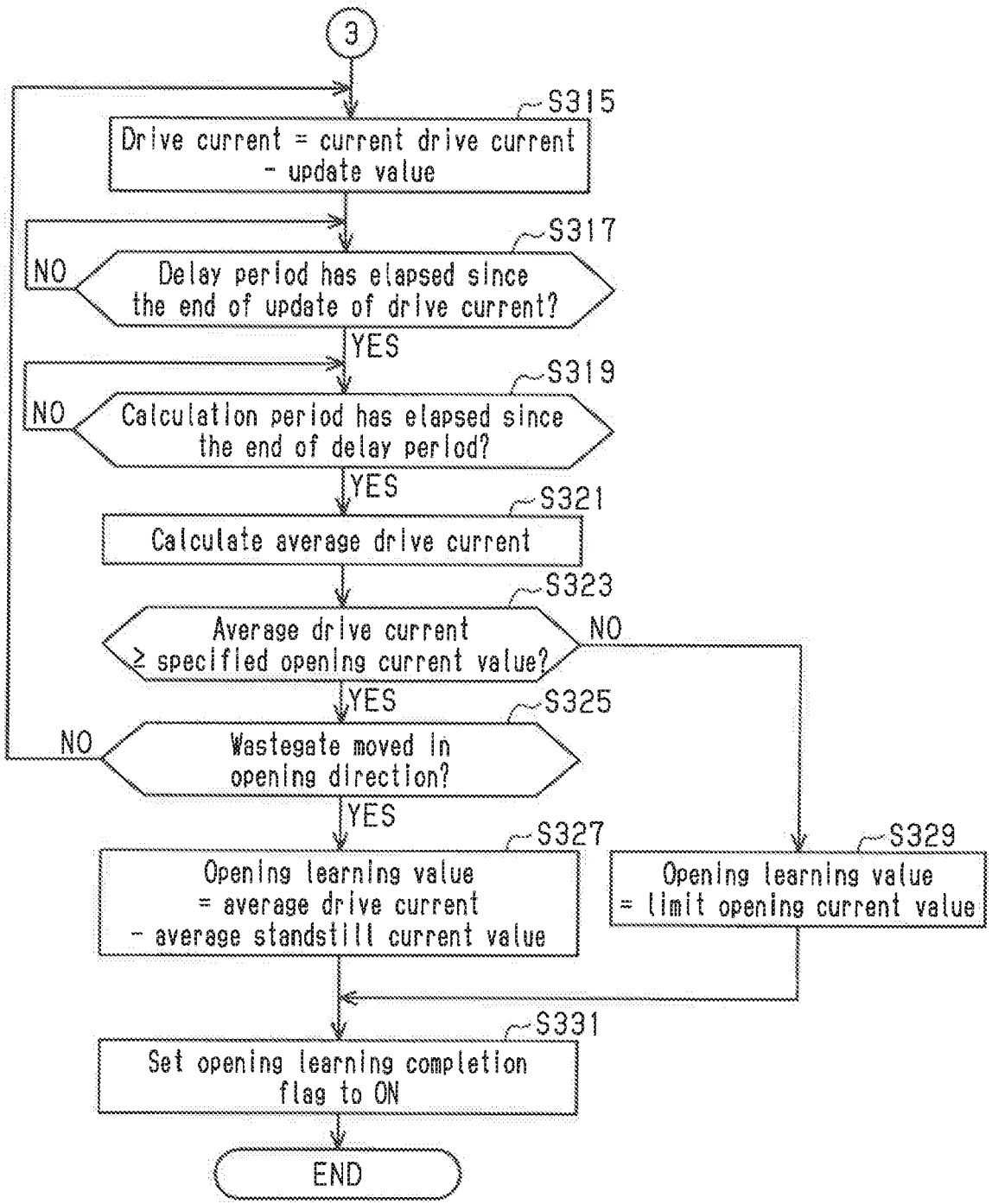

FIGS. 12A and 12B are flowcharts showing an example of the opening learning process described above. The flowcharts of FIGS. 12A and 12B differ from the flowcharts of FIGS. 5A and 5B in that three steps, step S395, step S397, and step S399, are added. The procedure of process shown in FIGS. 12A and 12B is now described focusing on these added steps.

If the learning section 10c determines at step S301 that the first opening learning value has not been updated in the set period (step S301: NO), the learning section 10c proceeds to step S395. At step S395, the learning section 10c determines whether the first closing learning value has been updated in the set period. When determining that the first closing learning value has been updated in the set period (step S395: YES), the learning section 10c proceeds to step S397. When determining that the first closing learning value has not been updated in the set period (step S395: NO), the learning section 10c proceeds to step S303. In this case, the learning section 10c performs steps S303 and S305 described above.

When proceeding to step S397, the learning section 10c sets the update value to a third update value. The third update value is smaller than the first update value and greater than the second update value. The learning section 10c then proceeds to step S399. At step S399, the learning section 10c sets the change starting current value using Equation (5) below.

$$\text{Change starting current value} = \text{standstill current value} - \text{previous first closing learning value} \times C \quad (5)$$

Coefficient C is a positive value smaller than coefficient B. As is evident from Equation (5), the previous first closing learning value is factored in the change starting current value with coefficient C. The learning section 10c then proceeds to step S311. The subsequent procedure is the same as that described with FIGS. 5A and 5B.

Coefficients AA, B and C may be changed to any positive values. Coefficients AA, B and C may be the same value or different values. Nevertheless, to avoid the change starting current value exceeding the value of the first drive current D1 that corresponds to the final learning value, each coefficient is preferably a positive value smaller than 1. Further, coefficient C, which is used to factor the first closing learning value into the change starting current value of an opening learning process as in the modification described above, is preferably smaller than coefficients AA and B. The first closing learning value tends to be similar to the first opening learning value, but they are not always the same value. Thus, when the first closing learning value is factored into the change starting current value of an opening learning process, the coefficient of the first closing learning value is preferably reduced. The same applies when the first opening learning value is factored in the change starting current value of a closing learning process.

The first, second, and third update values may be changed to any positive values. The first, second, and third update values may be the same. The magnitude relationship among the first, second, and third update values may be modified. A greater update value reduces the time required for the learning process. A smaller update value increases the accuracy of the learning value. The update value may be determined considering the balance between the time required for learning process and the accuracy of the learning value.

The update value in the opening learning process may be a negative value, and the right-hand side of the equation in step S315 may be an addition.

The first update value of the closing learning process may differ from that of the opening learning process. The same applies to the second update value, the third update value, and the corresponding relationship among the update values in the closing learning process.

The first, second, and third update values may be changed during a closing learning process or an opening learning process. For example, the update value may be gradually reduced during a closing learning process.

If the average first drive current DIV exceeds the specified closing current value successively over multiple closing learning processes, the first wastegate 123 or the first electric actuator 124 may be faulty. The first wastegate 123 or the first electric actuator 124 may be determined to be faulty when the average first drive current D1V exceeds the specified closing current value successively in two closing learning processes, for example, and the driver of the vehicle may be notified of the faulty condition. The same applies to the opening learning process. Further, the first wastegate 123 or the first electric actuator 124 may be determined to be faulty when the average first drive current D1V exceeds the specified current value in a closing learning process and the specified current value in an opening learning process successively, and the driver of the vehicle may be notified of the faulty condition.

A learning process may be performed without setting the specified closing current value or the specified opening current value. For example, when the internal combustion engine E includes an additional mechanism that detects an abnormality in the response of the first wastegate 123 to the first drive current D1, this mechanism may send a signal for stopping the learning process in the middle or for setting the learning value to the limit closing current value or the limit opening current value.

To calculate the specified closing current value, the limit closing current value may be added to the standstill current value instead of the average standstill current value. The same applies to the specified opening current value.

The limit closing current value may differ from the absolute value of the limit opening current value.

Regarding learning condition (A), the characteristics of the coupling mechanism may change the relationship between the opening degree of the first wastegate 123 and the magnitude of the force required to move the first wastegate 123 that is not under the exhaust pressure. When this relationship is changed according to the type of the coupling mechanism, the range of opening degrees in learning condition (A) needs to be changed according to the relationship. When the learning value obtained with an opening degree within a specific range is usable for the entire opening degree range (opening degrees of 0% to 100%) as is the case with the embodiment described above, this specific range of opening degrees may be used for learning condition (A). Depending on the relationship described above, the learning value obtained for one opening degree range may be unusable for the entire opening degree range. In this case, the opening degree range of 0% to 100% of the first wastegate may be divided into a plurality of ranges, and a learning value that is usable for each range may be obtained separately. That is, learning condition (A) is set for each of the opening degree ranges, and a learning process is performed for each of the opening degree ranges that are set.

Regarding learning condition (C), the determination on whether learning condition (C) is satisfied may be performed using only one or two of the parameters, the engine rotation speed EN, the vehicle speed SP, and the first intake air amount AS1. Nevertheless, it is still required that the first wastegate 123 and the first electric actuator 124 are unlikely to vibrate.

Regarding learning condition (D), the determination on whether learning condition (D) is satisfied may be performed using only one or two of the parameters, the water temperature WT in the engine body 23, the integrated first intake air amount AS1, and the first intake air temperature AT1. Nonetheless, the temperatures of the first wastegate 123 and the first electric actuator 124 still need to be relatively high.

A closing learning process may be performed while some of learning conditions (A) to (D) are not satisfied. Further, a closing learning process may be performed while none of learning conditions (A) to (D) is satisfied. The same applies to the opening learning process. When a learning process is performed only when all learning conditions (A) to (D) are satisfied, the opportunity for a learning process is very limited. Thus, relaxing the execution conditions for a learning process as described above increases the opportunity for learning. However, a learning process is performed without learning condition (A) satisfied only if the control of the boost pressure will not be compromised.

A closing learning process may be continued even if one or all of learning conditions (A) to (D) become unsatisfied during the closing learning process. That is, once a closing learning process starts, the closing learning process may be completed regardless of whether learning conditions (A) to (D) are satisfied. The same applies to the opening learning process.

The proportions of the delay period and the calculation period in one step period used when the drive current is changed in a stepwise manner in a learning process may be modified from those in the embodiment described above. For example, the first one-fourth of one step period may be the delay period, and the rest may be the calculation period. A longer delay period enhances advantages (5) and (6). A longer calculation period enhances advantage (7). The optimum proportions may be determined considering the balance of these advantages.

The delay period may be omitted. The detection value of the first opening degree sensor 127 changes when the parts that couple the first electric actuator 124 to the first wastegate 123 move to fill the gaps between them. If it is possible to estimate the amount of change in the detection value that corresponds to such movement, this amount may be subtracted from the detection value of the first opening degree sensor 127. This allows for identification of the change in the detection value of the first opening degree sensor 127 that corresponds to the movement of the first wastegate 123 without setting the delay period.

To calculate the amount of change in the first drive current D1 in the calculation period based on the detection value of the current detection section 10e, the average value of the first drive current D1 in the calculation period does not have to be used. For example, the median value between the maximum value and the minimum value of the first drive current D1 in the calculation period may be used. That is, as long as it is possible to calculate the amount of change in the first drive current D1 that is made until the first wastegate 123 is moved from standstill by a given opening degree, the first drive current D1 may be handled in any suitable manner in the calculation. The first drive current D1 supplied while the first wastegate 123 is stationary is used as the reference value in calculation of the amount of change in the first drive current D1. This reference value does not have to be the average standstill current value and may be any value that represents the first drive current D1 that is applied while the first wastegate 123 is stationary.

To determine whether the first drive current exceeds the specified closing current value or the specified opening current value in the calculation period based on the detection value of the current detection section 10e, the average value of the first drive current D1 in the calculation period does not have to be used. For example, the median value between the maximum value and the minimum value of the first drive current D1 in the calculation period may be used. That is, as long as it is possible to objectively determine whether the first drive current D1 in the calculation period is within the range between the upper and lower limits of the learning value, the first drive current D1 may be handled in any suitable manner in the determination.

The length of one step period used to change the first drive current D1 in a stepwise manner may be modified as appropriate. A shorter length reduces the time required for a learning process. However, this length needs to be long enough so that any movement of the first wastegate 123 by a given opening degree can be identified.

In changing the first drive current D1 in a stepwise manner, the first drive current D1 may be changed in a pulsed manner. Specifically, while the first drive current D1 is changed in a stepwise manner, the first drive current D1 may be returned to the change starting current value after each step period.

A certain type of electric actuator urges the wastegate in one direction with a spring, for example. This type of electric actuator may be used for the internal combustion engine to perform closing and opening learning processes.

When this type of electric actuator is used, a drive current is required to hold the wastegate that is not under the exhaust pressure at a given opening degree against the urging force. The value of this drive current is used as the standstill current value. In this case, the standstill current value is greater than 0. When such an electric actuator is used, the drive current is always a positive value irrespective of whether the wastegate is moved in the opening or closing direction. The closing and opening learning processes in the embodiment described above may be performed with such an electric actuator.

When an electric actuator that always receives a positive drive current, such as the one described above, is used, the first opening learning value may be calculated as a positive value. That is, at step S327, the value obtained by subtracting the average first drive current D1V from the average standstill current value may be used as the first opening learning value. In this case, the limit opening current value is also set to a positive value. When the first opening learning value is set to a positive value, the positive and negative signs in the equation for the change starting current value, the equation for the specified opening current value, and the equation relating the correction process of the first requested drive current D1W in the opening learning process may be changed corresponding to the sign of the first opening learning value.

Even when the first wastegate 123 is under the exhaust pressure, the closing and opening learning processes in the embodiment described above may be performed as long as the first wastegate 123 is held at the target opening degree. In this case, the value of the first drive current D1 that holds the first wastegate 123 at a given opening degree against the exhaust pressure is used as the standstill current value. This standstill current value is used as the reference when a learning value is obtained by changing the first drive current D1 in a stepwise manner. However, when the exhaust pressure is too large, advantage (12) described above is not achieved. Thus, the closing and opening learning processes are preferably performed only when the exhaust pressure exerted on the first wastegate 123 is not excessively large.

The determination on whether the first wastegate 123 is moved may use any method that detects whether the first wastegate 123 is moved by the given opening degree in the calculation period. For example, the determination may be performed based on the difference in opening degree of the first wastegate 123 between the start and the middle of the calculation period. Different point in times may be set in the calculation period, and the difference between the opening degree of the first wastegate 123 at the start of the calculation period and the opening degree at each point in time may be detected continually from the start of the calculation period. The determination on whether the first wastegate 123 is moved by the given opening degree may be performed at each point in time.

Instead of performing a correction process using a learning value obtained in one learning process as it is, a smoothed learning value, which is a learning value obtained by smoothing learning values learned in multiple learning processes, may be used for a correction process. The smoothed learning value may be calculated using Equation (6) below.

$$\text{Smoothed learning value} = (\text{Current learning value} - \text{previous learning value}) \times F + \text{previous learning value} \quad (6)$$

Coefficient F is a positive value smaller than 1, for example, 0.8.

The predetermined time used in the reference-position setting process of the first opening degree sensor 127 (step S22) may be modified as appropriate. This predetermined time may have any length that is long enough to verify that the first wastegate 123 remains at an opening degree of 0% for some time.

As long as the first opening degree sensor 127 detects the opening degree of the first wastegate 123, the detection target of the first opening degree sensor 127 may be modified as appropriate. For example, the first opening degree sensor 127 may detect the opening degree of the first wastegate based on the position of a component of the coupling mechanism.

Of the modifications described above, the modifications relating to the first bank 100 are also applicable to the second bank 200.

As the controller, the ECU 10 may be formed as a structure that includes a CPU and a ROM and executes software processing, but the controller is not limited to such a structure. For example, the controller may include a dedicated hardware circuit (e.g., an ASIC) that performs hardware processing of at least some of the processes in the embodiment described above that are subjected to software processing. That is, the controller may be any of the following structures (a) to (c). (a) The controller includes a processor, which executes all the processes described above following a program, and a program storage device such as a ROM, which stores the program (including a non-transitory computer-readable recording medium). (b) The controller includes a processor, which performs some of the processes described above following a program, a program storage device, and a dedicated hardware circuit that performs the rest of the processes. (c) The controller includes a dedicated hardware circuit that performs all of the processes described above. The controller may include a plurality of software processing circuits including a processor and a program storage device and a plurality of dedicated hardware circuits. That is, the processes described above may be performed by a processing circuit that includes at least either of one or more software processing circuits and one or more dedicated hardware circuits.

The invention claimed is:

1. A controller for an internal combustion engine, wherein the engine includes a forced-induction device, which is located in both of an intake passage and an exhaust passage and has a turbine located in the exhaust passage, a bypass passage, which bypasses the turbine and connects a section of the exhaust passage that is upstream of the turbine in an exhaust flow to a section of the exhaust passage that is downstream of the turbine in the exhaust flow, a wastegate, which opens and closes a flow path of the bypass passage, and an electric actuator, which moves the wastegate so as to open and close the wastegate, the controller comprising:
a processor configured to:
calculate a requested drive current for moving the wastegate to a target opening degree;
supply the electric actuator with a drive current that matches with the requested drive current;
perform a learning process that changes the drive current in a stepwise manner from a state where the wastegate is stationary in a given standstill position and learns, as a learning value, an amount of change in the drive current that is made until the wastegate is determined to be moved; and
perform a correction process that corrects the requested drive current based on the learning value.

2. The controller for an internal combustion engine according to claim 1, wherein
in the learning process, a predetermined delay period, which is a fixed period from a point in time at which the drive current is changed by one step, and a predetermined calculation period, which is a period between a point in time at which the delay period ends and a point in time at which the drive current is changed again, are set in advance, and
the wastegate is determined to be moved when the wastegate is moved at least by a given opening degree in the calculation period.

3. The controller for an internal combustion engine according to claim 2, wherein the processor is further configured to:
calculate, as the amount of change in the drive current that is learned as the learning value, a difference between an average value of the drive current supplied in a period in which the wastegate is stationary in the standstill position and an average value of the drive current supplied in the calculation period.

4. The controller for an internal combustion engine according to claim 3, wherein the processor is further configured to:
when the average value of the drive current supplied in the calculation period exceeds a specified current value while the drive current is changed in a stepwise manner from the state where the wastegate is stationary in the standstill position, learn, as the learning value, an amount of change in the drive current that is made between when the learning process is started and when the average value reaches the specified current value, even if the wastegate is not moved by the given opening degree.

5. The controller for an internal combustion engine according to claim 1, wherein the processor is further configured to:
when the learning value has not been updated in a predetermined set period, increase an amount of change in the drive current that is made per step in the learning process, as compared to when the learning value has been updated in the set period.

6. The controller for an internal combustion engine according to claim 1, wherein the processor is further configured to:
when the learning value has already been learned, calculate a change starting current value, from which the stepwise change in the drive current starts in the learning process, based on the learning value; and
in the learning process, start the stepwise change in the drive current after changing the drive current from the state where the wastegate is stationary in the standstill position to the change starting current value in a single step.

7. The controller for an internal combustion engine according to claim 1, wherein the processor is further configured to:
when an ignition switch is turned on, perform a closing learning process first and then perform an opening learning process after completing the closing learning process;
learn a closing learning value in the closing learning process by changing the drive current so as to reduce an opening degree of the wastegate; and
learn an opening learning value in the opening learning process by changing the drive current so as to increase the opening degree of the wastegate.

8. The controller for an internal combustion engine according to claim 1, wherein the processor is further configured to:
perform a closing learning process and an opening learning process alternately;
learn a closing learning value in the closing learning process by changing the drive current so as to reduce an opening degree of the wastegate; and
learn an opening learning value in the opening learning process by changing the drive current so as to increase the opening degree of the wastegate.

9. A controller for an internal combustion engine, wherein the internal combustion engine includes
a first bank,
a second bank,
a first forced-induction device, which is located in both of a first intake passage and a first exhaust passage for the first bank and has a first turbine located in the first exhaust passage,
a first bypass passage, which bypasses the first turbine and connects a section of the first exhaust passage that is upstream of the first turbine in an exhaust flow to a section of the first exhaust passage that is downstream of the first turbine in the exhaust flow,
a first wastegate, which opens and closes a flow path of the first bypass passage,
a first electric actuator, which moves the first wastegate so as to open and close the first wastegate,
a second forced-induction device, which is located in both of a second intake passage and a second exhaust passage for the second bank and has a second turbine located in the second exhaust passage, a second bypass passage, which bypasses the second turbine and connects a section of the second exhaust passage that is upstream of the second turbine in an exhaust flow to a section of the second exhaust passage that is downstream of the second turbine in the exhaust flow, a second wastegate, which opens and closes a flow path of the second bypass passage, and a second electric actuator, which moves the second wastegate so as to open and close the second wastegate, the controller comprising:

a processor configured to:
   calculate a first requested drive current for moving the first wastegate to a target opening degree, and calculate a second requested drive current for moving the second wastegate to a target opening degree;
   supply the first electric actuator with a drive current that matches with the first requested drive current and supply the second electric actuator with a drive current that matches with the second requested drive current;
   perform a first learning process that changes a first drive current, which is supplied to the first electric actuator, in a stepwise manner from a state where the first wastegate is stationary in a given first standstill position and learns, as a first learning value, an amount of change in the first drive current that is made until the first wastegate is determined to be moved; and
   perform a second learning process that changes a second drive current, which is supplied to the second electric actuator, in a stepwise manner from a state where the second wastegate is stationary in a given second standstill position and learns, as a second learning value, an amount of change in the second drive current that is made until the second wastegate is determined to be moved; and
   correct the first requested drive current based on the first learning value and correct the second requested drive current based on the second learning value.

10. A method for controlling an internal combustion engine, wherein the engine includes a forced-induction device, which is located in both of an intake passage and an exhaust passage and has a turbine located in the exhaust passage, a bypass passage, which bypasses the turbine and connects a section of the exhaust passage that is upstream of the turbine in an exhaust flow to a section of the exhaust passage that is downstream of the turbine in the exhaust flow, a wastegate, which opens and closes a flow path of the bypass passage, and an electric actuator, which moves the wastegate so as to open and close the wastegate, the method comprising:
   calculating a requested drive current for moving the wastegate to a target opening degree;
   supplying the electric actuator with a drive current that matches with the requested drive current;
   changing the drive current in a stepwise manner from a state where the wastegate is stationary in a given standstill position;
   determining whether the wastegate is moved by changing the drive current in a stepwise manner;
   performing a learning process that learns, as a learning value, an amount of change in the drive current that is made until the wastegate is determined to be moved; and
   performing a correction process that corrects the requested drive current based on the learning value.

11. A non-transitory computer-readable storage medium storing a program that causes a processor to perform a control process for controlling an internal combustion engine that includes a forced-induction device, which is located in both of an intake passage and an exhaust passage and has a turbine located in the exhaust passage, a bypass passage, which bypasses the turbine and connects a section of the exhaust passage that is upstream of the turbine in an exhaust flow to a section of the exhaust passage that is downstream of the turbine in the exhaust flow, a wastegate, which opens and closes a flow path of the bypass passage, and an electric actuator, which moves the wastegate so as to open and close the wastegate, wherein the control process comprises:
   calculating a requested drive current for moving the wastegate to a target opening degree;
   supplying the electric actuator with a drive current that matches with the requested drive current;
   changing the drive current in a stepwise manner from a state where the wastegate is stationary in a given standstill position;
   determining whether the wastegate is moved by changing the drive current in a stepwise manner;
   performing a learning process that learns, as a learning value, an amount of change in the drive current that is made until the wastegate is determined to be moved; and
   performing a correction process that corrects the requested drive current based on the learning value.

* * * * *